United States Patent
Harada et al.

(10) Patent No.: US 7,817,213 B2
(45) Date of Patent: Oct. 19, 2010

(54) METHOD FOR DRIVING LIQUID CRYSTAL DEVICE AND DRIVING APPARATUS FOR THE LIQUID CRYSTAL DEVICE

(75) Inventors: Haruo Harada, Kanagawa (JP); Yasunori Okano, Kanagawa (JP); Chisato Urano, Kanagawa (JP); Hiroshi Arisawa, Kanagawa (JP); Makoto Gomyo, Tokyo (JP); Taijyu Gan, Kanagawa (JP); Yasuhiro Yamaguchi, Kanagawa (JP); Tomozumi Uesaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 203 days.

(21) Appl. No.: 12/247,863

(22) Filed: Oct. 8, 2008

(65) Prior Publication Data
US 2009/0231501 A1    Sep. 17, 2009

(30) Foreign Application Priority Data
Mar. 13, 2008    (JP)    ............................ 2008-063611

(51) Int. Cl.
    *G02F 1/135*    (2006.01)
    *G09G 3/36*     (2006.01)
(52) U.S. Cl. ............................ 349/25; 349/33; 345/87; 345/94; 345/98
(58) Field of Classification Search .................. 349/25, 349/33, 169, 175, 182, 185; 345/87–100, 345/204, 208–210
See application file for complete search history.

(56) References Cited

U.S. PATENT DOCUMENTS

| 4,435,047 | A | 3/1984 | Fergason |
| 6,067,135 | A | 5/2000 | Shimizu et al. |
| 7,522,141 | B2 * | 4/2009 | Mi et al. .................. 345/95 |
| 2006/0012556 | A1 * | 1/2006 | Yoneda et al. ............. 345/98 |
| 2007/0008262 | A1 | 1/2007 | Harada et al. |

FOREIGN PATENT DOCUMENTS

| JP | B2-7-9512 | 2/1995 |
| JP | A-9-236791 | 9/1997 |
| JP | A-9-258258 | 10/1997 |
| JP | A-11-237644 | 8/1999 |
| JP | B2-3178530 | 4/2001 |
| JP | A-2007-17461 | 1/2007 |

* cited by examiner

*Primary Examiner*—Hemang Sanghavi
(74) *Attorney, Agent, or Firm*—Oliff & Berridge, PLC

(57) ABSTRACT

Sequentially performed are (1) an entire liquid crystal layer is initialized into a focal conic state, (2) an image is written onto the liquid crystal device by scanning with selecting exposure or non-exposure while applying a voltage that does not exceed a threshold value for a state change from the focal conic state to a homeotropic state during the non-exposure but exceeds the threshold value during the exposure and that causes the focal conic state and the homeotropic state to be bi-stable after the exposure, and (3) the application of the voltage is stopped to change a state of a portion, of which the state has changed to the homeotropic state, to the planer state. In (2), an electric field energy applied to an exposure portion of the liquid crystal layer is controlled to gradually increase from a start to an end of the series of scanning actions.

12 Claims, 18 Drawing Sheets

F: FOCAL CONIC STATE WITH MANY DOMAINS
H: HOMEOTROPIC STATE

F: FOCAL CONIC STATE WITH MANY DOMAINS
F': FOCAL CONIC STATE WITH A FEW DOMAINS
H: HOMEOTROPIC STATE
H' IMPERFECT HOMEOTROPIC STATE

AT A TIME OF INITIAL LIGHT IRRADIATION DURING A SERIES OF SCANING

AT A TIME OF LIGHT IRRADIATION FOR FINAL LINE DURING A SERIES OF SCANING

METHOD FOR DRIVING LIQUID CRYSTAL DEVICE AND DRIVING APPARATUS FOR THE LIQUID CRYSTAL DEVICE

CROSS-REFERENCE TO RELATED APPLICATIONS

This application is based on and claims priority under 35 USC 119 from Japanese Patent Application No. 2008-63611 filed Mar. 13, 2008.

BACKGROUND

1. Technical Field

The invention relates to a driving apparatus for writing an image onto a liquid crystal device that displays and records the image using a liquid crystal and a photoconductor, and a method for driving the liquid crystal device.

2. Related Art

Various researches have been made on a rewritable marking technique that is highly convenient. As one direction of the rewritable marking technique, a display medium using a cholesteric liquid crystal has gained public attention recently. This is because the display medium using the cholesteric liquid crystal has characteristics of having a memory property capable of holding display without power source, providing a bright display due to non-use of a polarizer, and allowing color display without using a color filter.

A planer state of the cholesteric liquid crystal (chiral nematic liquid crystal) causes a selective reflection phenomenon in which light incident in parallel to a helical axis is divided into a right-handed polarized light and a left-handed polarized light, circularly polarized light component, which coincides with a twist direction of spiral, is Bragg reflected, and the remaining light are transmitted. The central wavelength $\lambda$ and the reflection wavelength width $\Delta\lambda$ of the reflected light are represented as $\lambda = n \cdot p$, $\Delta\lambda = \Delta n \cdot p$, where p denotes a helical pitch, n denotes an average refractive index within a plane orthogonal to the helical axis, and $\Delta n$ denotes a birefringence index. The reflected light from the cholesteric liquid crystal layer of the planer state displays a vivid color dependent on the helical pitch.

The cholesteric liquid crystal with positive dielectric anisotropy has three states, that is, the planar state, the focal conic state and the homeotropic state. In the planar state, the helical axis is perpendicular to the cell surface, and the selective reflection phenomenon occurs with respect to the incident light as shown in FIG. 17A. In the focal conic state, the helical axis is almost parallel to the cell surface, and the incident light is slightly forward-scattered and transmitted as shown in FIG. 17B. In the homeotropic state, the helical structure is relaxed, and a liquid crystal director is oriented in the electric field direction to fully transmit the incident light as shown in FIG. 17C.

Of the three states, the planer state and the focal conic state can exist bi-stably without electric field. Accordingly, the state of the cholesteric liquid crystal is not uniquely determined for a strength of an electric field applied to the liquid crystal layer. If the planer state is in the initial state, the cholesteric liquid crystal changes in order of the planer state, the focal conic state and the homeotropic state with increase in strength of the electric field. If the focal conic state is in the initial state, the cholesteric liquid crystal changes in order of the focal conic state and the homeotropic state with increase in strength of the electric field.

On the other hand, when the strength of the electric field applied to the liquid crystal layer is rapidly decreased to zero, the planer state and the focal conic state keep the as-is state, and the homeotropic state changes to the planer state.

Accordingly, immediately after a pulse signal is applied, the cholesteric liquid crystal layer shows a switching behavior shown in FIG. 18. When the applied voltage of the pulse signal is greater than or equal to Vfh, the cholesteric liquid crystal layer changes from the homeotropic state to the planer state and becomes the selective reflection state. When the applied voltage is between Vpf and Vfh, the cholesteric liquid crystal layer becomes a transmission state due to the focal conic state. When the applied voltage is less than or equal to Vpf, the cholesteric liquid crystal layer continuously keeps a state that is the state before the pulse signal is applied, that is, keeps the selective reflection state due to the planer state or keeps the transmission state due to the focal conic state.

In FIG. 18, the vertical axis represents a normalized light reflectivity, in which the light reflectivity is normalized, supposing that the maximum light reflectivity is 100 and the minimum light reflectivity is 0. A transition area exists between any two of the planer state, the focal conic state and the homeotropic state. Therefore, the selective reflection state is defined as a state where the normalized light reflectivity is 50 or more, and the transmission state is defined as a state where the normalized light reflectivity is less than 50. Also, Vpf denotes the threshold voltage for the state change between the planer state and the focal conic state, and Vfh denotes the threshold voltage for the state change between the focal conic state and the homeotropic state.

The display medium with the cholesteric liquid crystal may have a structure in which the liquid crystal is sealed in as the continuum phase between one pair of display substrates, a PDLC (Polymer Dispersed Liquid Crystal) structure in which the cholesteric liquid crystal is dispersed like drops in the polymer binder, and a PDMLC (Polymer Dispersed Microencapsulated Liquid Crystal) structure in which the microencapsulated cholesteric liquid crystal is dispersed in the polymer binder (for example, see JP Hei. 7-9512 B (corresponding to U.S. Pat. No. 4,435,047), JP Hei.9-236791 A (corresponding to U.S. Pat. No. 6,067,135), Japanese Patent No. 3178530).

Using the PDLC structure or PDMLC structure suppresses the fluidity of liquid crystal. Therefore, distortion of an image due to a bend or pressure is reduced. Thereby, the flexible medium can be realized. Also, the color display can be made by directly laminating plural cholesteric liquid crystal layers thereon, or a display medium for addressing an image with an optical signal can be made by laminating a photoconductor layer thereon. Furthermore, a display layer can be formed using a thick-film print technology. Thereby, there is such an advantage that the manufacturing method is simplified and the cost is reduced.

Many display media using this technique have been proposed (for example, see JP Hei. 11-237644 A).

The photo-writing type (photo-address type) display medium according to this technique performs monochrome display in various hues having a memory property under no electric field or performs color display having a memory property under no electric field, by switching between (A) the selective reflection state provide by the planer state and (B) the transmission state provided by the focal conic state, using a bi-stable phenomenon of the cholesteric liquid crystal.

The liquid crystal device according to this technique can form an image on the entire surface without simultaneous exposure. Therefore, an image can be written by scanning the surface of the liquid crystal device using a scanning-type exposure device, for example, a laser beam exposure device or a light emitting diode array.

FIG. 19 is a schematic view schematically showing how to write an image on the liquid crystal device with the scanning-type exposure device according to this technique. The liquid crystal device according to this technique has a pair of electrode substrates, a display layer that is the liquid crystal layer, an OPC layer that is the photoconductor layer, and a light shielding layer as shown in FIG. 19 The display layer and the OPC layer are disposed between the pair of electrode substrates. Also, the display layer and the OPC layer are laminated with sandwiching the light shielding layer therebetween. After resetting the entire surface of the display layer to the planer state, a desired recording image can be written by scanning and imagewisely exposing the surface of the OPC layer using the exposure device such as a line head or a beam scanner while a predetermined bias voltage is being applied to the both transparent electrodes.

JP 2007-17461 A (corresponding to U.S. 2007/0008262 A) has proposed a driving method in which a write operation is divided into an initialization step, a write step and a display determination step. This driving method does adopts a state change from the focal conic state to the homeotropic state at a higher state change speed as a switch in the write step, but does not adopt a state change from the planer state to the focal conic state at a slower state change speed. In this driving method, a write time is greatly shortened by time sharing only an operation in the write step at the higher state change speed and scanning the entire surface of the liquid crystal device for every pixel or every line.

SUMMARY

According to an aspect of the invention, a driving apparatus for a liquid crystal device records an image onto the liquid crystal device. The liquid crystal device includes at least a liquid crystal layer containing a cholesteric liquid crystal, a photoconductor layer and electrodes disposed outside the liquid crystal layer and the photoconductor layer. The liquid crystal layer and the photoconductor layer are laminated. The driving apparatus at least includes a power source device, an exposure device and a controller. The power source device is configured to apply a voltage between the electrodes. The exposure device is configured to expose the liquid crystal device while scanning the liquid crystal device. The controller is configured to control the power source device and the exposure device by performing, in order, (i) an initialization action of initializing the entire liquid crystal layer into a focal conic state by causing the power source device to apply a voltage that exceeds a threshold value for a state change of the liquid crystal layer from a planer state to the focal conic state, (ii) a write action of writing the image onto the liquid crystal device by causing the exposure device to scan with selecting exposure or non-exposure while causing the power source device to apply a voltage, the voltage that does not exceed a threshold value for a state change of the liquid crystal layer from the focal conic state to a homeotropic state during the non-exposure but exceeds the threshold value during the exposure, the voltage that causes the focal conic state and the homeotropic state to be bi-stable after the exposure, and (iii) a display determination action of stopping the power source device to apply the voltage, to change a state of a portion, of which the state has changed to the homeotropic state, to the planer state. In the write action, the controller controls at least the power source device and the exposure device so that an electric field energy applied to an exposure portion of the liquid crystal layer gradually increases from a start of a series of scanning actions to an end of the series of scanning actions.

In this specification, the phrase "a series" in the phrase "a series of scanning operations" or "a series of scanning actions" refers to a period for which a write voltage is applied continuously during an operation (action) of scanning with selecting exposure or non-exposure while applying the write voltage in a write step (the applied voltage in the write step may be hereinafter referred to as the "write voltage").

Accordingly, for example, when scanning is performed over several lines for every pixel while a voltage is being applied continuously without stopping the application of voltage between lines, the overall scanning operation (action) of scanning over the several lines corresponds the "series of scanning operations" or the "series of scanning actions". On the other hand, when scanning is performed over several lines for every pixel while the application of the voltage is stopped between lines and the voltage application to each line and stop of the voltage application are repeated (except the case where the voltage non-application time is too short to have influence on an orientation state of the liquid crystal), each scanning operation (action) for one line corresponds to the "series of scanning operations" or the "series of scanning actions".

Also, the term "operation" may refer to work actually performed in each step of the driving method, and the term "action" may refer to an action performed by a component (components) of the driving apparatus. In the driving apparatus, the component is (components are) controlled to perform an operation (operations) of the driving method as an action (actions). As a result, the term "operation" and the term "action" are consequently almost synonymous in this application.

BRIEF DESCRIPTION OF THE DRAWINGS

Exemplary embodiments of the invention will be described in detail based on the following figures, wherein:

FIGS. 9A and 9B are schematic views showing a state change of a liquid crystal in the write step for the first line in the chart of FIG. 4, wherein FIG. 9A shows a state change from the start time of the scanning operation to the start time of the writing step, and FIG. 9B shows a state change from the start time of the write step to the end time of the write step;

FIGS. 10A and 10B are schematic views showing a state changes of liquid crystal in the write step for the final line in the chart of FIG. 4, wherein FIG. 10A shows a state change from the start time of the scanning operation to the start time of the write step, and FIG. 10B shows a state change from the start time of the write step to the end time of the write step;

FIGS. 17A to 17C are schematic explanatory views showing the relationship between the molecule alignment and the optical characteristic for the cholesteric liquid crystal, wherein FIG. 17A shows the planer state, FIG. 17B shows the focal conic state and FIG. 17C is the homeotropic state.

DETAILED DESCRIPTION

Figure 19:
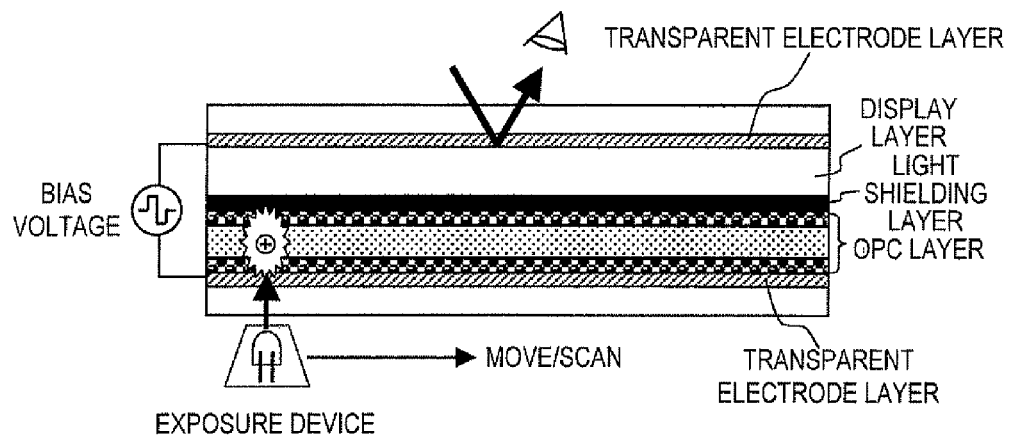
FIG. 19 is a schematic view schematically showing how to write the image with the scanning-type exposure device by the conventional driving method for the liquid crystal device.

As shown in FIG. 19, during writing of an image, the liquid crystal layer forms a desired recording image by producing a contract between (i) a portion in which its state changes from the planer state to the focal conic state and (ii) a portion in which its state does not change, depending on the presence or absence of exposure. The state change from the planer state to the focal conic state takes a few hundreds ms (about 200 ms or more) to complete the state change. Also, a write time of a few hundreds ms is spent for each scanning line (or each pixel). Therefore, it takes an enormous total time to rewrite the entire surface of the liquid crystal device.

Thus, some of the inventors of this application have proposed, in JP 2007-17461 A (corresponding to U.S. 2007/0008262 A), a practical technique relating to a method and apparatus for driving a liquid crystal device in which the write time is shortened even if an image is written by exposure using the scanning-type exposure device.

However, the inventors has found that, in some cases, a reflectivity of an obtained image gradually decreases from an initial light irradiation to a light irradiation for the final line (or the final pixel) in a series of scanning, which produces unevenness in the obtained image.

Figure 20:
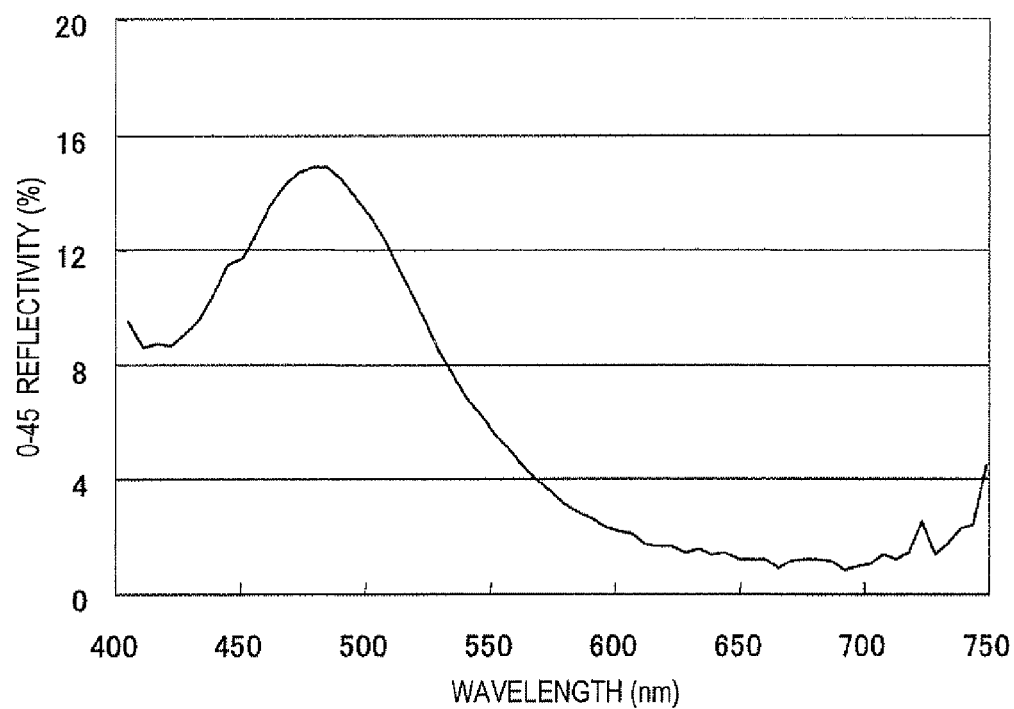
FIG. 20 is a graph representing one example of the reflectivity of the display image at the initial time of light irradiation in one series of scanning operations when the image is written with the scanning-type exposure device by the conventional driving method for the liquid crystal device.
Figure 21:
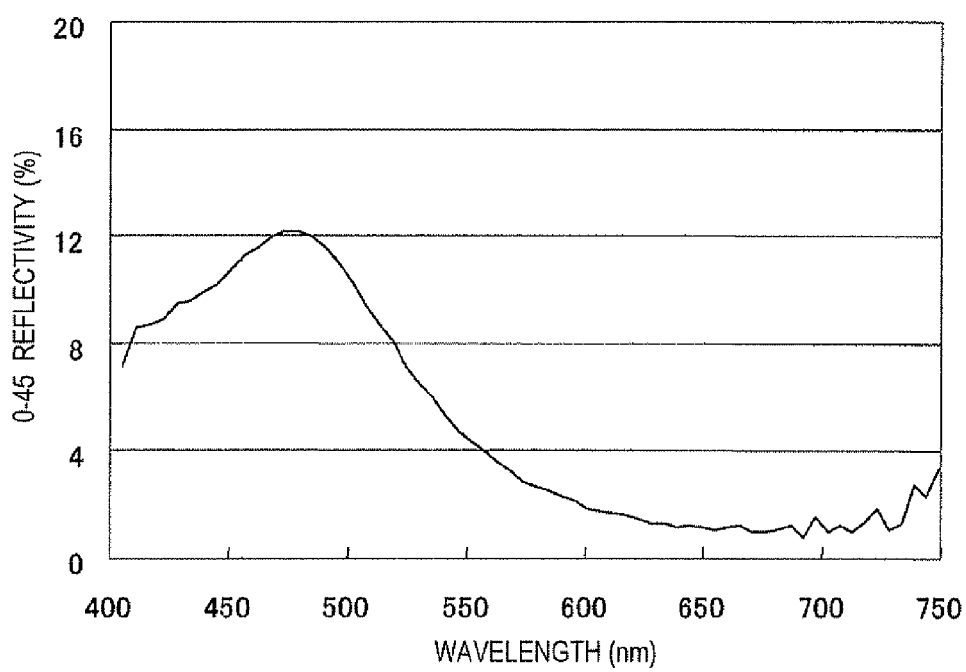
FIG. 21 is a graph representing one example of the reflectivity of the display image at the time of light irradiation in the final line in one series of scanning operations when the image is written with the scanning-type exposure device by the conventional driving method for the liquid crystal device.

FIG. 20 is a graph representing one example of a reflectivity (0-45 reflectivity (%): a reflectivity with respect to a perfect diffusion surface, which is obtained when external light is incident from a direction of 0° with respect to the vertical direction of the display surface and light reflected in a direction of 45° is measured) of a light irradiated portion in the initial line in the series of scanning. FIG. 21 is a graph representing a reflectivity (same as above) of the light irradiated portion in the final line in the series of scanning. From the comparison between the both graphs, it can be found that the reflectivity of the light irradiated portion in the final line decreases as a whole including the before and after a wavelength 470 nm at which the reflectivity takes its peak.

Some of exemplary embodiments described below provide a driving apparatus for a liquid crystal deice using a cholesteric liquid crystal and a method for driving the liquid crystal device using the cholesteric liquid crystal, in which a write time is short and the obtained display image contains less unevenness even if exposure is performed by a scanning-type exposure device to write the image onto the liquid crystal device.

Exemplary embodiments of the invention will be described below in detail with reference to the accompanying drawings.

[Basic Technique]

A method for driving a liquid crystal device according to an exemplary embodiment (hereinafter may be simply referred to as a "driving method") basically includes three operations, that is, an initialization step, a write step and a display determination step. An driving apparatus for the liquid crystal device according to the exemplary embodiment (hereinafter may be simply referred to as a "driving apparatus") is controlled to perform the operations of those steps as actions by a power source device, an exposure device and so on, which are included in the driving apparatus.

First, a basic technique that is a premise of the exemplary embodiments will be described below.

Figure 1:
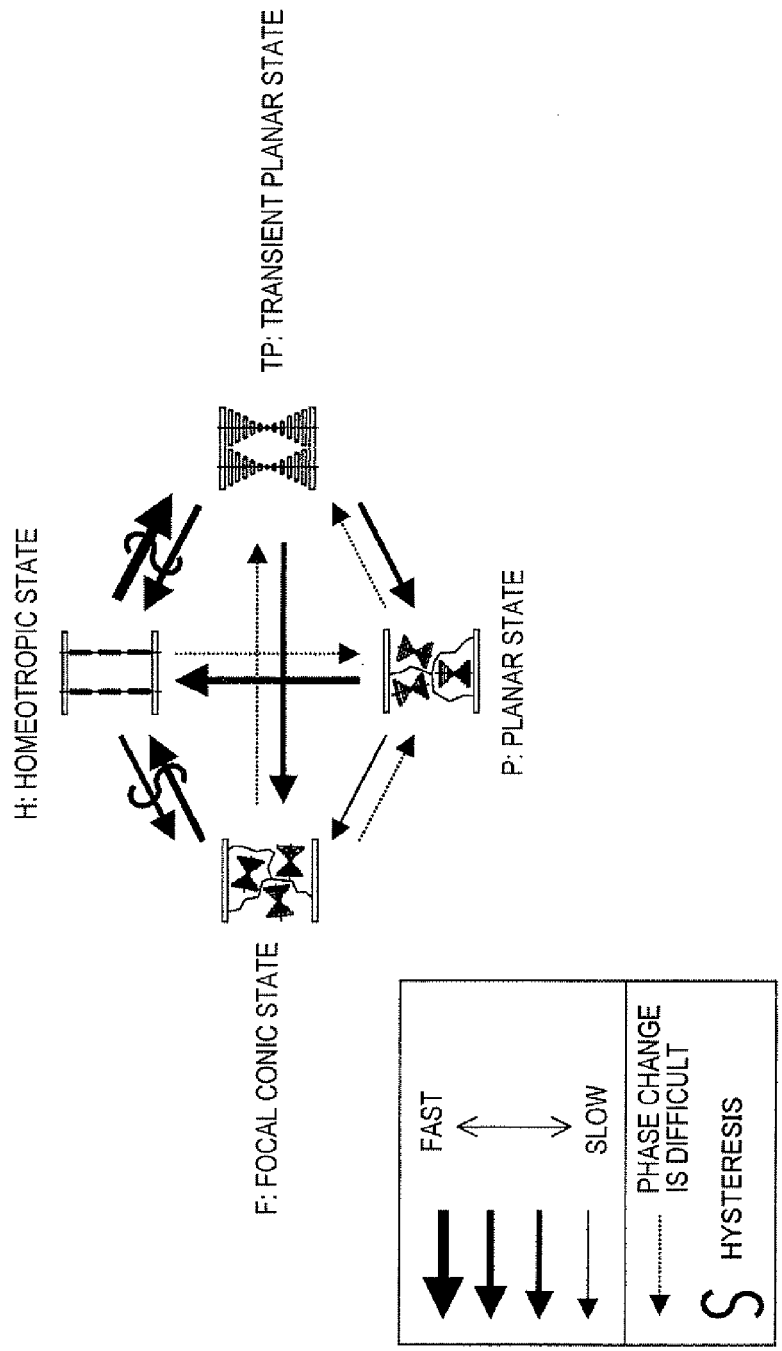
FIG. 1 is a schematic view showing state changes in a cholesteric liquid crystal.

FIG. 1 schematically shows state changes in a cholesteric liquid crystal. As a voltage is applied, the cholesteric liquid crystal changes its state from the planer state to the focal conic state, and further to the homeotropic state.

With the technique described in JP Hei.7-9512 B (corresponding to U.S. Pat. No. 4,435,047, an initial state is set to the planer state, and the state change occurs from the planer state to the focal conic state by performing imagewise exposure in a state where a voltage is being applied. Thereby, an image is written onto a liquid crystal layer (display layer). Both of the planer state and the focal conic state are kept as they are even after the applied voltage is removed, so that the written image can be held stably.

Figure 2:
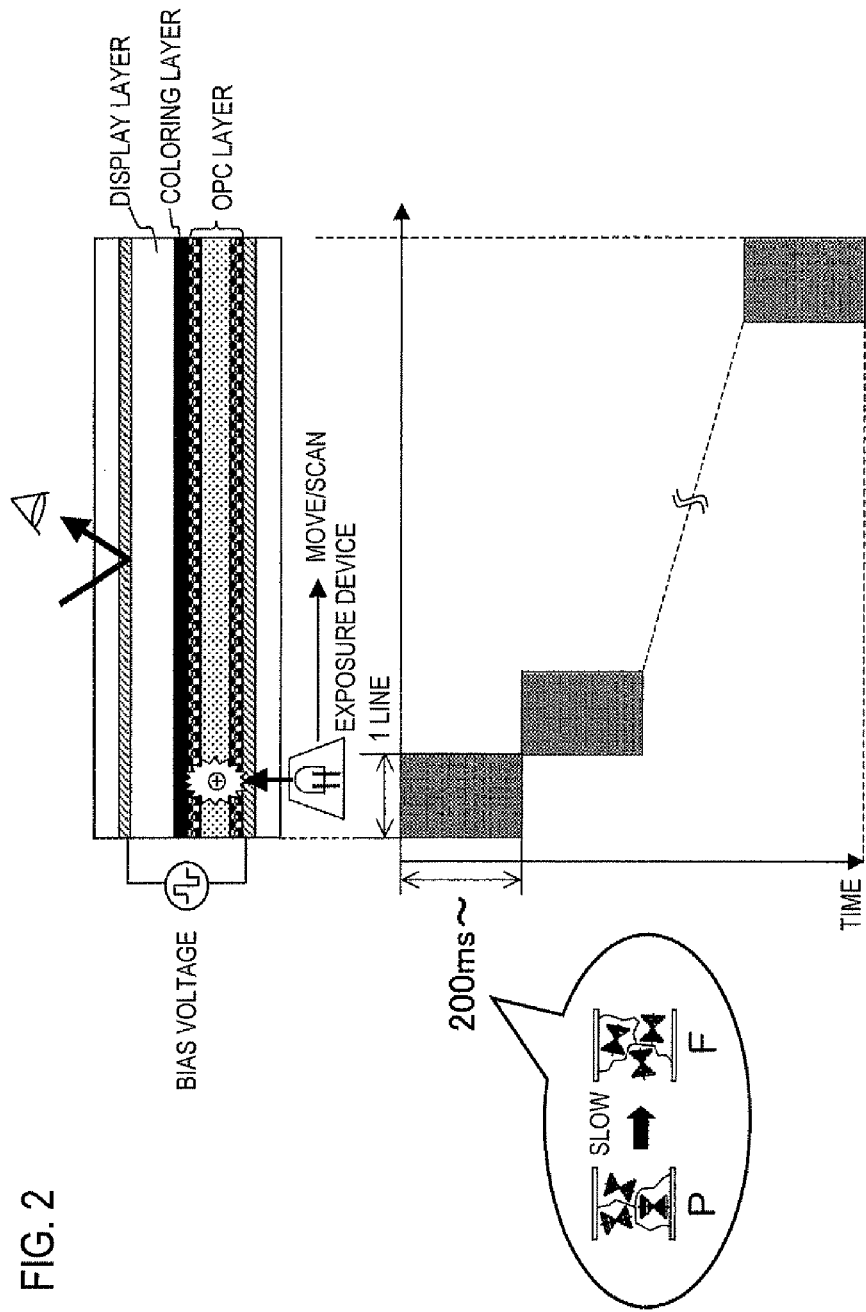
FIG. 2 is an explanatory view for explaining a write time in writing an image with a scanning-type exposure device by a method, of the related art, for driving a liquid crystal device.

However, the state change speed from the planer state to the focal conic state is very slow as shown in FIG. 1. Therefore, it takes a few hundreds ms, as already described. If a few hundreds ms is spent for each pixel or line, it takes an enormous time to scan over the entire liquid crystal surface and to write an image. That is, the time of at least 200 ms is spent for each line, and after the state change fully occurs, the operation shifts to the exposure of the next line. Therefore, it takes "200 ms or more"×the number of lines to write, as shown in FIG. 2. When an image of 100 lines is written, it takes 20 seconds or more. When an image of 480 lines is written, it takes one minute 30 seconds or more. Therefore, it cannot be said that the above technique is sufficiently practical to write an image.

FIG. 2 is an explanatory view for explaining a write time in writing with a scanning-type exposure device by a method, of the related art, for driving the liquid crystal device.

The basic technique uses the stage change from the focal conic state to the homeotropic state at the high state change speed but does not use the stage change from the planer state to the focal conic state at the slow state change state. That is, a bias voltage and an address light intensity are set so that
- the focal conic state (F state) changes to the homeotropic state (H state) during light irradiation, and
- the F state and the H state become bi-stable after the light irradiation.

After the entire surface is changed to the F state by starting the application of the bias voltage, an image is written using the exposure device to apply light to a reflection portion of the image based on image data.

The state of the liquid crystal layer in each of bright and dark portions changes as follows:

(1) reset to the initial state (F state) (initialization step/action), (2) either one of two states of H state and F state are selected by turning address light, which is emitted from the exposure device ON or OFF (write step/action), (3) the selected state between H state and F state is kept bi-stable, and (4) the bias voltage is removed after writing all lines, so that a portion in the H state is changed to the planer state (P state) and a portion in the F state is kept intact in the F state to determine display (display determination step/action) and an image is displayed.

Because of using the state change (alignment change) from the F state to the H state at high speed and using the fact that image information provided by the both states is maintained in the hysteresis at the bias voltage, time required to perform exposure (photo-address) can be reduced, and the writing time can be greatly shortened.

Figure 3:
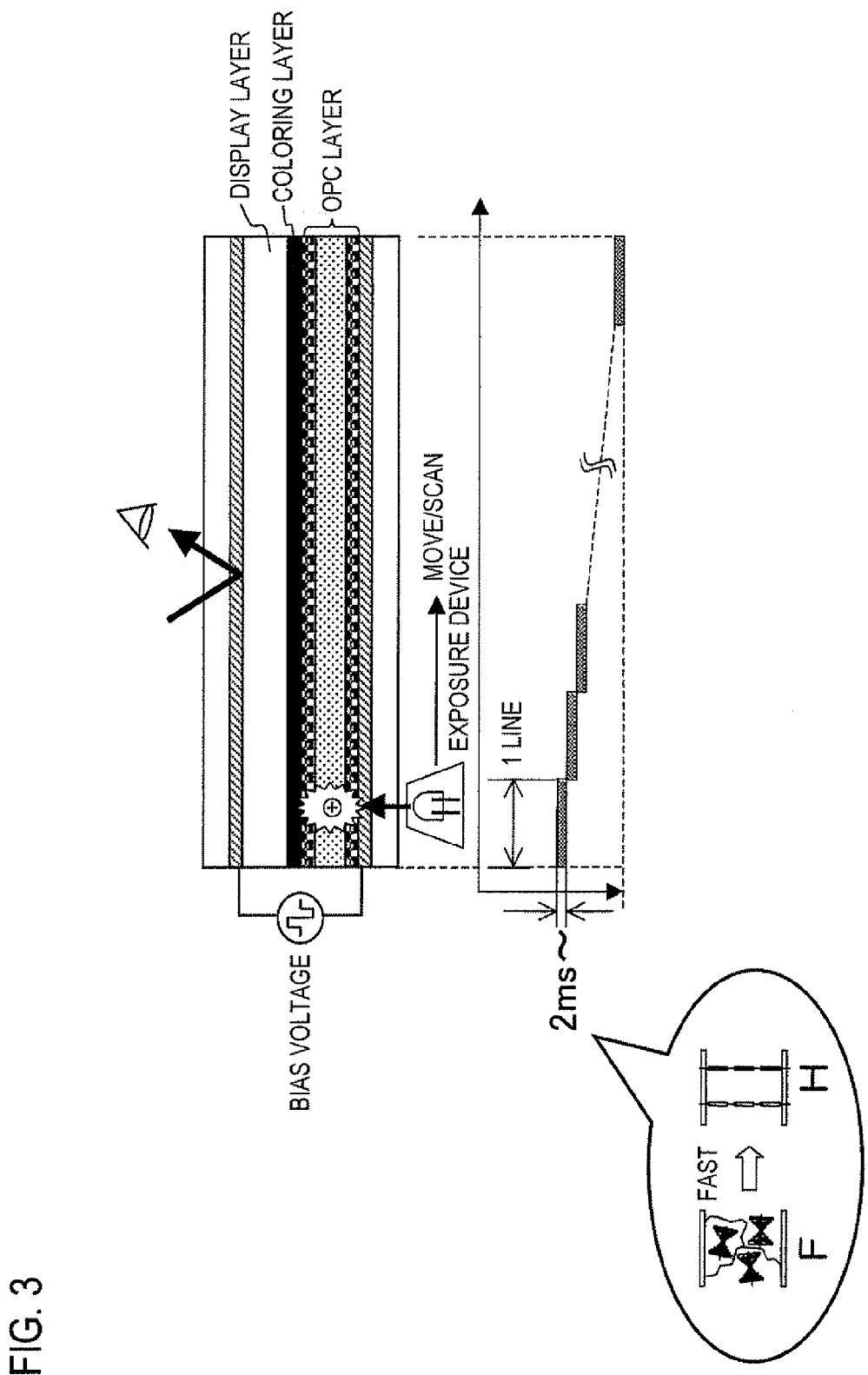
FIG. 3 is an explanatory view for explaining the write time in writing an image by a method for driving the liquid crystal device according to a basic technique.

Since the exposure time required to change from the F state to the H state is about 2 ms or more, the write time can be theoretically shortened to 1% at maximum, as compared with the related art using the state change from the P state to the F state. FIG. 3 is an explanatory view, like FIG. 2, for explaining the write time according to the basic technique. As will be apparent from FIG. 3, according to the basic technique, the write time for one line can be greatly shortened, and the total write time can be greatly shortened.

That is, since the time required for writing is "2 ms or more"×the number of lines, about 0.2 seconds is sufficient, for example, to write an image of 100 lines, and about 2.5 seconds is actually sufficient to write an image of 480 lines. Thereby the utility of the writing, which was not good in the related art, can be remarkably improved by this basic technique.

Principle of Exemplary Embodiments

With the driving method according to the basic technique as described above, the write time can be greatly shortened even if an image is written by exposure with the scanning-type exposure device. However, a reflectivity of the obtained image decreases little by little from the initial time of light irradiation to the time of light irradiation for the final line (or final pixel) in a series of scanning, which causes unevenness in the image in some cases as previously described.

To resolve this phenomenon, in the exemplary embodiments, an electric field energy applied to an exposed portion of the liquid crystal layer is controlled to gradually increase from a start of a series of scanning operations to the end of the series of scanning operations, in the write step process of the three steps (actions). With this configuration, it is possible to reduce unevenness in the image by suppressing decrease of a reflectivity of the image obtained from the start to the end of the series of scanning operations.

This principle will be inferred and described below.

Figure 4:
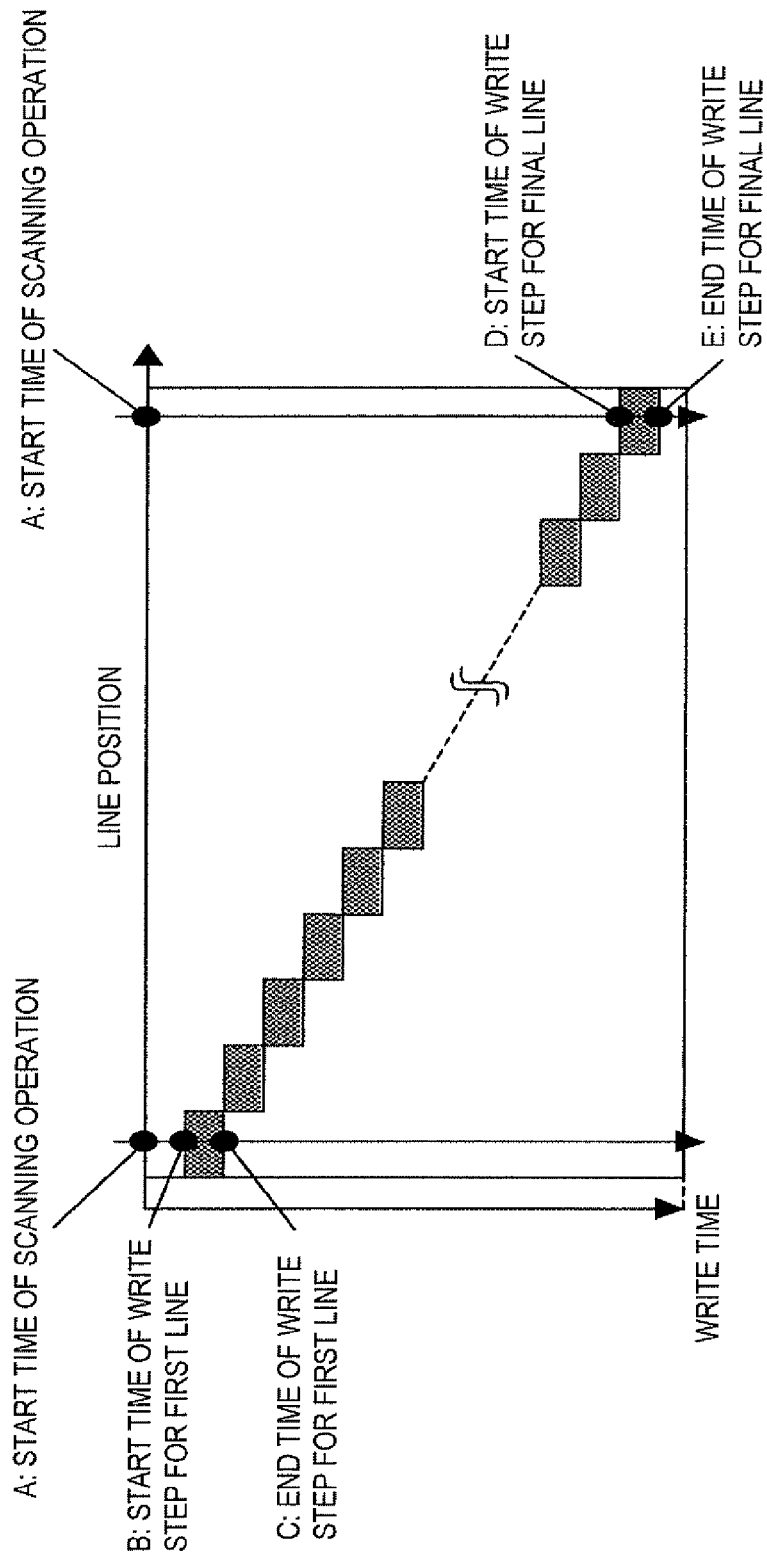
FIG. 4 is a chart showing transition of the writing according to the basic technique in a time series manner.

FIG. 4 is a chart showing transition of the writing according to the basic technique in a time series manner. Similarly to FIGS. 2 and 3, the vertical axis represents passage of the write time, the horizontal axis represents a position of a scanning line, and the hatched area represents that an operation of the write step (irradiation of write light and application of the bias voltage) is performed. In an example of FIG. 4 the write time (exposure time) per scanning line is 3 ms, and the start time of the write step for the final line D is 2,000 ms after the start time of the scanning operation A.

Figure 5:
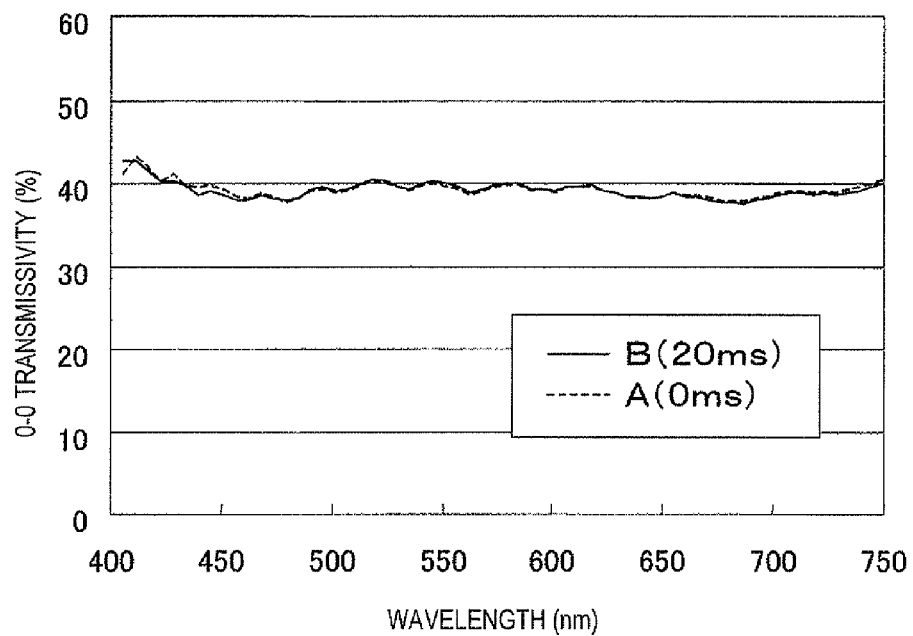
FIG. 5 is a graph representing a result of measuring a light transmissivity of the liquid crystal device in a halfway stage of the writing shown in the chart of FIG. 4, and comparing a start time of the scanning operation and a start time of the write step for the first line.
Figure 6:
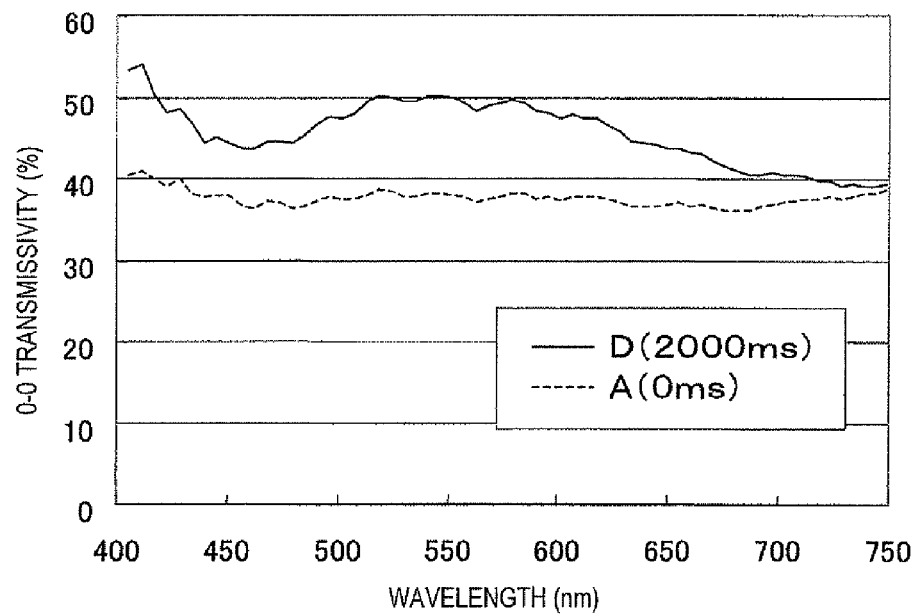
FIG. 6 is a graph representing a result of measuring a light transmissivity of the liquid crystal device in a halfway stage of the writing shown in the chart of FIG. 4, and comparing the start time of the scanning operation and the start time of the write step for the final line.

As shown in FIG. 4, scanning is started from the first line, and the operation of the write step is performed. Respective operation lines are scanned successively, and the operation of the write step for the final line is ended. Then, a series of scanning operations (actions) is completed FIGS. 5 to 8 are graphs representing results of light transmissivity of the liquid crystal device at a halfway stage of the series of scanning operations (actions). Here, the light transmissivity of the liquid crystal device is 0-0 transmissivity (%) (a transmissivity which is obtained when external light is incident from a direction of 0° with respect to the vertical direction of the display surface and light transmitting in the direction of 0° is measured). FIG. 5 is a graph for a comparison between the start time of the scanning operation A (0 ms) and the start time of the write step for the first line B (20 ms). FIG. 6 is a graph for a comparison between the start time of the scanning operation A (0 ms) and the start time of the write step for the final line D (2,000 ms).

As can be seen from the graph of FIG. 5, in the first line, there is almost no difference in light transmissivity between the start time of the scanning operation A and the start time of the write step B. However, seeing FIG. 6, in the final line, there is a great disparity in light transmissivity between the start time of the scanning operation A and the start time of the write step D. The start times of the write step B and D are in a state where the operation of the write step is not yet performed, that is, the write light is not applied. From these graphs, it can be found that a state of the liquid crystal before writing is different between the first line and the final line.

Figure 7:
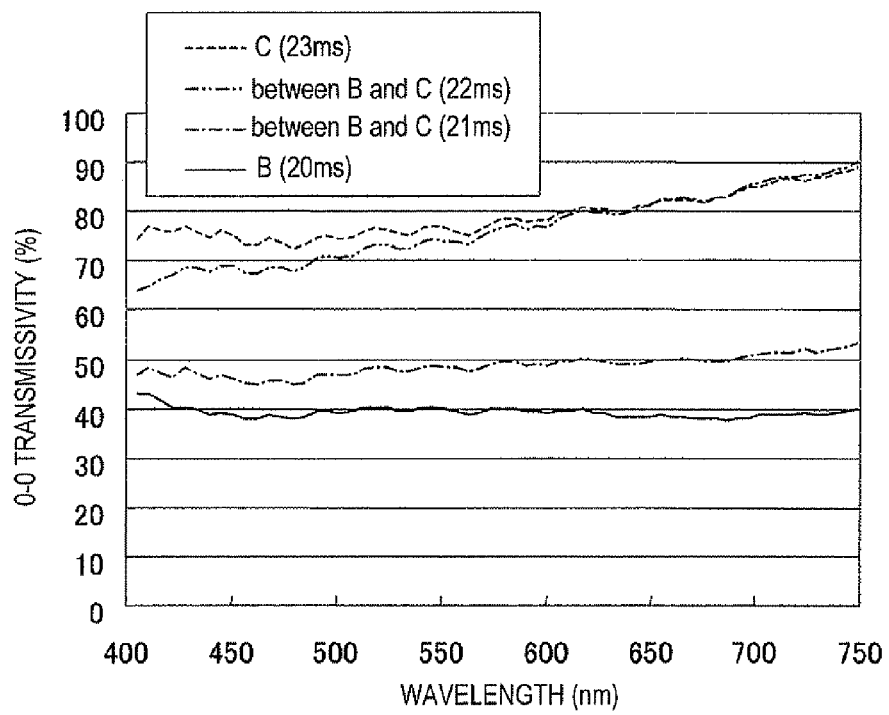
FIG. 7 is a graph representing a result of measuring a light transmissivity of the liquid crystal device in a halfway stage of the writing shown in the chart of FIG. 4, and showing transition of the transmissivity every 1 ms from the start time of the write step for the first line to the end time of the write time for the first line.
Figure 8:
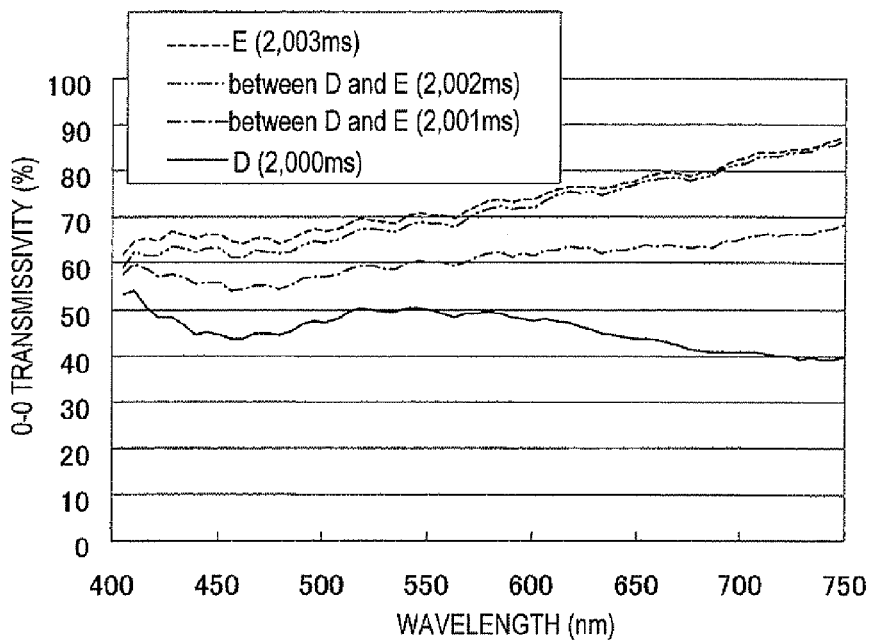
FIG. 8 is a graph representing a result of measuring a light transmissivity of the liquid crystal device in a halfway stage of the writing shown in the chart of FIG. 4, and showing transition of the transmissivity every 1 ms from the start time of the write step for the final line to the end time of the write step for the final line.

On the other hand, FIG. 7 is a graph showing transition every 1 ms from the start time of the write step for the first line B (20 ms) to the end time of the write step for the first line C (23 ms). FIG. 8 is a graph showing transition from the start time of the write step for the final line D (2,000 ms) to the end time of the write step for the final line E (2,003 ms).

The liquid crystal layer, which is brought by the initialization step into the transmission state caused by the focal conic state, is changed to the homeotropic state by performing the operation of the write step (application of the bias voltage and irradiation of the write light). Since the homeotropic state has a higher transmissivity than the focal conic state, the transmissivity of the liquid crystal layer increases as the operation of the write step progresses, as can be seen from the graphs of FIGS. 7 and 8. However, scrutinizing both the graphs minutely, it is confirmed that the transmissivity changes more slowly in the final line than in the first line, that is, the orientation change rate of liquid crystal is slower.

Between the first line and the final line, that is, between the initial stage and near the end in a series of scanning operations, there is a great difference in length of the time for which the bias voltage is applied until the scanning exposure. From this difference and the phenomenon as previously described with reference to FIGS. 4 to 8, it is inferred that the following phenomenon may occur in the liquid crystal layer as shown in FIGS. 9 and 10.

Figure 9A:
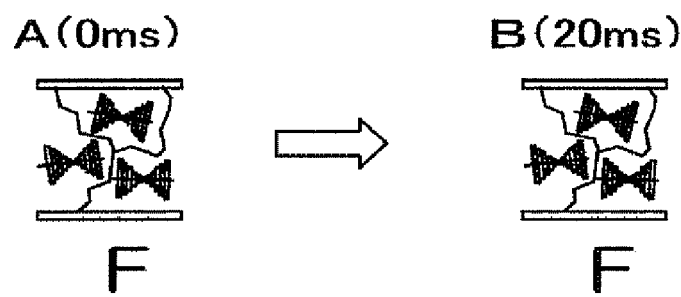
Figure 9B:
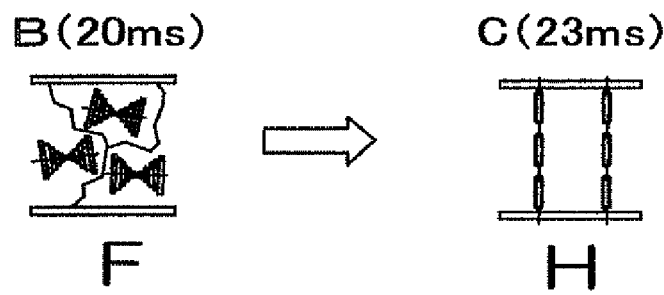

FIG. 9 schematically shows a state change of liquid crystal in the write step for the first line in the chart of FIG. 4. In the first line, there is passage of short time between the start time of the scanning operation A and the start time of the write step B, and the application time of the bias voltage is short. Therefore, the focal conic state with many domains is kept in the same state (0-0 transmissivity is low due to a great amount of forward scattered light) as shown in FIG. 9A. If the operation of the write step is performed from that state, it is expected that the state quickly changes to the homeotropic state with many domain interfaces (defects) being used as starting points, as shown in FIG. 9B.

Figure 10A:
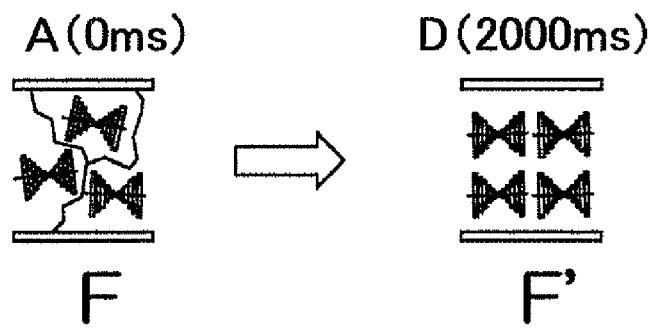
Figure 10B:
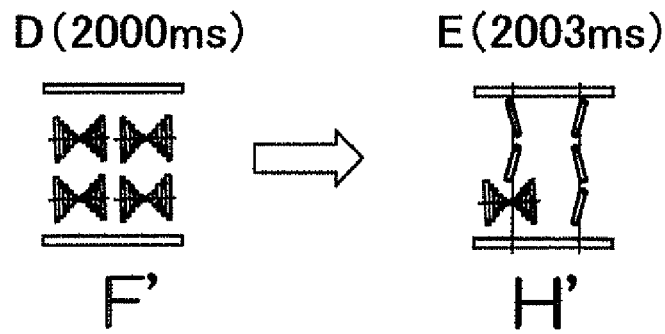

FIG. 10 schematically shows the state change of the liquid crystal in the write step for the final line in the chart of FIG. 4. In the final line, a long time (2000 ms) has passed from the start time of the scanning operation A to the start time of the write step D, and the application time of the bias voltage is long. Therefore, the liquid crystal progresses to the pretty focal conic state with a few domains (0-0 transmissivity is high due to a small amount of forward scattered light) as shown in FIG. 10A. If the operation of the write step is performed from that state, it is expected that the state change to the homeotropic state is less likely to occur because there are a few domain interfaces (defects) from which the orientation change starts.

In addition, when the applied bias voltage is DC, the effective voltage may be decreased due to special bias of charges on the liquid crystal layer. That is, ion charges are biased in the liquid crystal layer by applying the voltage for a long time, and even if the voltage applied to the liquid crystal device is equal, the electric field energy actually applied to the liquid crystal layer decreases, which is considered as a reason why it takes a lot of time that the liquid crystal changes its state to the homeotropic state.

In any case, the reason why the reflectivity of the display image decreases little by little from the initial stage to the final line in a series of scanning is that the cholesteric liquid crystal in the liquid crystal layer gets more difficult to change its state to the homeotropic state with passage of the write voltage application time, and the sensitivity of the liquid crystal device decreases.

To resolve this cause, in the write operation (action) of the exemplary embodiments, an electric field energy applied to an exposed portion of the liquid crystal layer is controlled to gradually increase from a start of a series of scanning operations (actions) to the end of the series of scanning operations (actions). The sensitivity of the liquid crystal device that is inferred to decrease little by little in a series of scanning operations (actions) can be compensated with the increasing electric field energy, which making it possible to suppress decrease of a reflectivity and to reduce unevenness in the display image.

The period for which the electric field energy is gradually increased is from the start of the series of scanning operations (actions) to the end of the series of scanning operations (actions). If the application of voltage is stopped halfway and resumed again, the electric field energy is reset to the initial amount every time, and the electric field energy is controlled to gradually increase from a time at which the application of voltage is resumed.

[Three Exemplary Modes]

Three exemplary methods for gradually increasing the electric field energy in the write step (action) will be described below.

(1) Gradually Increasing Bias Voltage

In this mode, a magnitude of the applied bias voltage is gradually increased from the start of a series of scanning operations (actions) to the end of the series of scanning operations (actions). This mode changes the magnitude of the applied voltage to control the electric field energy so that the electric field energy gradually increases.

When the bias voltage is increased gradually, a partial voltage applied to the liquid crystal layer is increased gradually even with the same exposure intensity or at the same scanning speed. Therefore, the electric field energy can be gradually increased toward the final line, and fluctuation in energy required for writing within a plane can be corrected.

According to this mode, it is possible to write a uniform image onto a plane without a total write time being extended.

The magnitude of the bias voltage must not be set to be so large that the bias voltage per se exceeds the threshold value for a state change from the focal conic state to the homeotropic state. The magnitude of the bias voltage is set so as to satisfy the condition that "a voltage that does not exceed a threshold value for a state change of the liquid crystal layer from the focal conic state to the homeotropic state during non-exposure but exceeds the threshold value during exposure".

Specifically, an extent to which the bias voltage is gradually increased depends on a time period of the series of scanning operations (actions), a light intensity of the write light, hue of the write light, the configuration of the liquid crystal device, a frequency of the bias voltage and so on, and it is difficult to categorically define the extent. Therefore, before practically using this mode, the optimal condition may be obtained in advance by making experiments.

(2) Gradually Increasing Light Intensity

In this mode, a light intensity of the exposed portion is gradually increased from the start of a series of scanning operations (actions) to the end of the series of scanning operations (actions). This mode changes the light intensity so as to gradually increase an electric field energy that is photo-electrically converted in the photoconductor layer.

By gradually increasing the light intensity, an amount of photo-carriers generated in the photoconductor layer increases gradually, so that a voltage applied to the liquid crystal layer is increased gradually even at the same bias voltage or at the same scanning speed. Therefore, the electric field energy of the exposed portion can be gradually increased toward the final line, and fluctuation in energy required for writing within a plane can be corrected.

According to this mode, it is possible to write a uniform image onto a plane without a total write time being extended.

If the light intensity is too large, the effect is saturated. Therefore, the light intensity is selected in a range where the electric field energy can be gradually increased. Of course, the light intensity satisfies the condition required for the write light, that is, the condition that "a light intensity that does not exceed a threshold value for a state change of the liquid crystal layer from the focal conic state to the homeotropic state during non-exposure but exceeds the threshold value during exposure".

Specifically, an extent to which the light intensity is gradually increased depends on a time period of a series of scanning operations (actions), a magnitude of the bias voltage, a frequency of the bias voltage, the configuration of the liquid crystal device, and hue of the write light and so on, and it is difficult to categorically define the extent. Therefore, before practically using this mode, the optimal condition may be obtained in advance by making experiments.

(3) Decreasing Scanning Speed

In this mode, a scanning speed is gradually decreased from the start of a series of scanning operations (actions) to the end of the series of scanning operations (actions). This mode changes the scanning speed so that the electric field energy is gradually increased.

By decreasing the scanning speed gradually, a bias voltage application time for each scanning line and the exposure time of the write light for each scanning line become longer. Therefore, it becomes possible to gradually increase the electric field energy of the exposed portion toward the final line and to correct fluctuation in energy required for writing within a plane.

According to this mode, although a total write time becomes longer, the bias voltage and the light intensity of the write light are constant. Therefore, it is possible to write a uniform image onto a plane using a simple power source device and a simple exposure device.

Any of these three modes may be performed singly, but two or more of these modes may be combined. For example, both of the bias voltage and the light intensity may be gradually increased from the start of a series of scanning operations (actions) to the end of the series of scanning operations (actions). Alternatively, the bias voltage may be gradually increased while the scanning speed is gradually made slower.

Exemplary Embodiments

Figure 11:
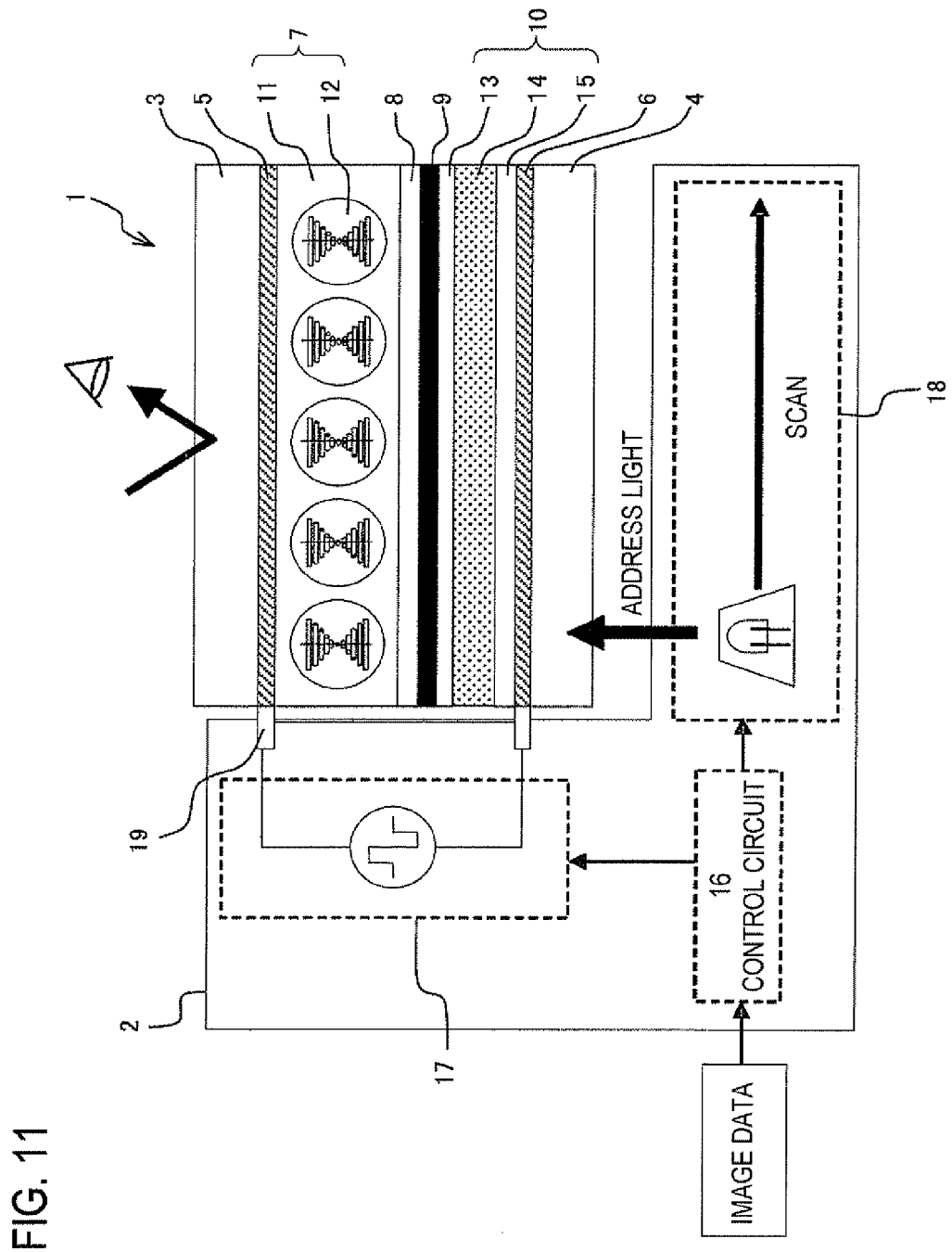
FIG. 11 is a schematic configuration view of a system to which a method for driving the liquid crystal device according to an exemplary embodiment of the invention is applied.

FIG. 11 is a schematic configuration view of a system to which a method for driving a liquid crystal device according to an exemplary embodiment of the invention is applied. The system of this exemplary embodiment includes a display medium (liquid crystal device) 1 and a write apparatus (driving apparatus for the liquid crystal device) 2.

<Display Medium>

The display medium 1 is a member capable of making a photo-address operation by irradiation of address light and application of a bias voltage, and specifically is a liquid crystal device.

In this exemplary embodiment, the display medium 1 has a transparent substrate 3, a transparent electrode (electrode) 5, a liquid crystal layer 7, a laminate layer 8, a colored layer (light shielding layer) 9, an OPC layer (photoconductor layer) 10, a transparent electrode (electrode) 6 and a transparent substrate 4 that are laminated in order from the display face side.

(Transparent Substrate)

The transparent substrates 3, 4 are members for holding respective functional layers between their inner surfaces, and intended to maintain the structure of the display medium 1. The transparent substrates 3, 4 are sheet-like substances having the enough strength to withstand an external force. The transparent substrate 3 on the display face side transmits at least incident light, and the transparent substrate 4 on the write face side transmits at least address light. The transparent substrates 3, 4 may have flexibility.

Specific materials of the transparent substrates 3, 4 include an inorganic sheet (e.g., glass silicon), and a polymer film (e.g., polyethylene terephthalate, polysulfone, polyether sulfone, polycarbonate, polyethylene naphthalate). The well-known functional films such as a contamination resisting film, a wear-proof film, an anti-reflection coating and a gas barrier film may be formed on the outer surface.

It is noted that in this exemplary embodiment, even if the display medium includes a substrate, the substrate is not necessarily transparent.

(Transparent Electrode)

The transparent electrodes 5, 6 are members intended to apply a bias voltage, which is applied from the write apparatus 2, to the respective functional layers in the display medium 1 uniformly in plane. The transparent electrode 5, 6 has uniform conductivity in plane. The transparent electrode 5 on the display face side transmits at least the incident light, and the electrode 6 on the write face side transmits at least the address light. Specifically, conductive thin films made of a metal (e.g., gold, aluminum), metallurgical oxide (e.g., indium oxide, tin oxide, indium tin oxide (ITO)), or a conductive organic polymer (e.g., polythiophene, polyaniline) may be employed. The well-known functional film such as an adhesion improvement film, an anti-reflection coating or a gas barrier film may be formed on the surface.

It is noted that in this exemplary embodiment, the electrodes 5, 6 are not necessarily transparent.

(Liquid Crystal Layer)

The liquid crystal layer 7 according to this exemplary embodiment has a function of modulating a reflection/transmission state of the incident light by the electric field, using a change in an optical interference state of the cholesteric (chiral nematic) liquid crystal. The liquid crystal 7 can hold the selected state even without the electric field. As a display layer, the liquid crystal layer 7 may have a structure not deformable when an external force such as bending or pressure is applied thereto.

The liquid crystal layer 7 of this exemplary embodiment is a liquid crystal layer formed with a self-holding liquid crystal complex composed of the cholesteric liquid crystal and a transparent resin. That is, because of the self-holding characteristic as the complex, the liquid crystal layer does not need the spacer. In this exemplary embodiment, a cholesteric liquid crystal 12 is dispersed in a polymer matrix (transparent resin) 11.

It is noted that in this exemplary embodiment, the liquid crystal layer 7 is not necessarily the self-holding liquid crystal complex, but may be simply composed of a liquid crystal only.

The cholesteric liquid crystal 12 has a function of modulating the reflection/transmission state of the specific color light of the incident light. In the cholesteric liquid crystal 12, the liquid crystal molecules are oriented helically, which causes coherent reflection of a specific light, which depends on the helical pitch, among the light incident from the helical axis direction. The orientation is changed under the electric field, thereby changing the reflection state. If the liquid crystal layer is the self-holding liquid crystal complex, the liquid crystal layer may be oriented in monolayer and densely with the uniform drop size.

The specific examples of the liquid crystal that can be used as the cholesteric liquid crystal 12 may include steroid cholesterol derivative, nematic liquid crystal or smectic liquid crystal (e.g., Shiff base, azo, azoxy, benzoic ester, biphenyl, tarphenyl, cyclohexyl carbonate ester, phenyl cyclohexane, biphenyl cyclohexane, pyrimidine, dioxyne, cyclohexyl cyclohexane ester, cyclohexyl ethane, cyclohexane, tolane, alkenyl, stilbene, condensed rings), or their mixture with chiral agent (e.g., steroid cholesterol derivative, Shiff base, azo, ester, biphenyl) added.

The helical pitch of the cholesteric liquid crystal is such that when the display color is blue, green, or red, for example, the central wavelength of the selective reflection may be in the range from 400 nm to 500 nm, from 500 nm to 600 nm, or from 600 nm to 700 nm, respectively. To control the helical pitch of the cholesteric liquid crystal, the liquid crystal molecules are given an appropriate chemical structure, or a kind of chiral agent and an additive amount of the chiral agent to the nematic liquid crystal are generally adjusted.

To form the self-holding liquid crystal complex in which the liquid crystal layer including the cholesteric liquid crystal 12 and the polymer matrix (transparent resin) 11, the PNLC (Polymer Network Liquid Crystal) structure in which the nested resin is contained in the continuum phase of the cholesteric liquid crystal or the PDLC (Polymer Dispersed Liquid Crystal) structure (including micro-capsulated liquid crystal) may be employed. With the PNLC structure or PDLC structure, an anchoring effect occurs in the interface between the cholesteric liquid crystal and the polymer. Thereby, it is possible to make a more stable holding state of the planer state and the focal conic state without electric field.

The PNLC structure or PDLC structure can be formed by the well-known methods for making the phase separation between the polymer and the liquid crystal, including, for example, a PIPS (Polymerization Induced Phase Separation) method in which the polymer precursor that is polymerized due to heat, light or electron beam such as acryl, thiol or epoxy, and the liquid crystal are mixed and polymerized from the state of homogeneous phase to make the phase separation, an emulsion method in which the polymer with low solubility of liquid crystal such as polyvinyl alcohol and the liquid crystal are mixed and suspended by agitation to disperse droplets of liquid crystal in the polymer, a TIPS (Thermally Induced Phase Separation) method for making the phase separation in which the thermoplastic polymer and the liquid crystal are mixed and cooled from the heated state in homogeneous phase, and an SIPS (Solvent Induced Phase Separation) method for making the phase separation between the polymer and the liquid crystal in which the polymer and the liquid crystal are dissolved in the solvent such as chloroform and the solvent is evaporated, though the methods are not specifically limited.

The polymer matrix 11 has a function of holding the cholesteric liquid crystal 12, and restraining the flow of the liquid crystal (change of the image) due to deformation of the display medium 1 and is suitably made of polymer material which does not dissolve in the liquid crystal material and has the liquid incompatible with the liquid crystal as the solvent. Also, the material of the polymer matrix 11 desirably has an enough strength to withstand the external force, and indicates high transmissivity to at least the reflected light and the write light (address light).

Examples of the material that can be employed for the polymer matrix 11 may include the water soluble polymer materials (e.g., gelatin, polyvinyl alcohol, cellulose derivative, polyacrylic acid polymer, ethylene imine, polyethylene oxide, polyacrylamide, plystyrene sulfonate, polyamidine, isoprene sulfonic acid polymer), or aqueous emulsion materials (e.g., fluororesin, silicone resin, acrylic resin, urethane resin, epoxy resin).

(OPC Layer)

The OPC layer (photoconductor layer) 10 is a layer having an internal photoelectric effect, and a property that its impedance characteristic varies according to an irradiation intensity of address light. The OPC layer capable of performing the AC operation may be driven in symmetry to the address light, and suitably has a three layer structure in which a charge generation layer (CGL) is laminated on and under a charge transport layer (CTL). In this exemplary embodiment, the OPC layer 10 has an upper charge generation layer 13, a charge transport layer 14 and a lower charge generation layer 15 that are laminated in succession from the upper side in FIG. 11.

The charge generation layers 13 and 15 have a function of absorbing the address light to generate photo-carriers. Mainly, the charge generation layer 13 governs the amount of photo-carriers flowing in a direction from the transparent electrode 5 on the display face side to the transparent electrode 6 on the write face side, and the charge generation layer 15 governs the amount of photo-carriers flowing in a direction from the transparent electrode 6 on the write face side to the transparent electrode 5 on the display face side. The charge generation layers 13 and 15 may be those absorbing the address light to generate excitons to be efficiently separated into free carriers inside the charge generation layer or on the interface between the charge generation layer and the charge transport layer.

The charge generation layers 13 and 15 may be produced by a dry method for directly forming the film from the charge generation materials (e.g., metal or non-metal phthalocyanine, squarium compound, azulenium compound, perylene pigment, indigo pigment, bis or tris azo pigment, quinacridon pigment, pyrrolopyrrole color, polycyclic quinone pigment, cyclo-condensed aromatic pigment such as dibromoanthanthrone, cyanine color, xanthene pigment, charge transfer complex such as polyvinylcarbazole or nitrofluorene, or eutectic complex composed of pyrylium salt dye and polycarbonate resin), or a wet coating method for forming the film by dispersing or dissolving these charge generation materials together with the polymer binder (e.g., polyvinyl butyral resin, polyarylate resin, polyester resin, phenolic resin, vinylcarbazole resin, vinylformal resin, partially denatured vinylacetal resin, carbonate resin, acrylic resin, vinyl chloride resin, styrene resin, vinyl acetate resin, and silicone resin) in an appropriate solvent to prepare a coating liquid, and coat and dry it.

The charge transport layer 14 is a layer having a function of drifting the photo-carriers, which are generated in the charge generation layers 13 and 15 and injected from the charge generation layers 13 and 15, in the direction of the electric field applied by a bias signal. Generally, the charge transport layer 14 has a thickness about a few tens times as large as that of the charge generation layer. Therefore, the capacity of the charge transport layer 14, the dark current in the charge transport layer 14, and the photo-carrier current inside the charge transport layer 14 determine the overall light and dark impedance of the OPC layer 10.

The charge transport layer 14 suitably has free carriers efficiently injected from the charge generation layers 13 and 15 (may have the close ionization potential to the charge generation layers 13 and 15) in which the injected free carriers hop as fast as possible. To increase the impedance at the dark time, the dark current due to hot carriers may decreased.

The charge transport layer 14 may be formed by preparing a hole transport material of low molecule (e.g., trinitrofluoren compound, polyvinylcarbazole compound, oxadiazole compound, hydrazone compound such as benzyl amino hydrazone or quinoline hydrazone, stilbene compound, triphenylamine compound, triphenylmethane compound, benzidine compound), or an electron transport material of low molecule (e.g., quinone compound, tetracyanoquinone dimethane compound, fluorenone compound, xanthone compound, benzophenone compound) that is dispersed or dissolved together with polymer binder (e.g., polycarbonate resin, polyarylate resin, polyester resin, polyimide resin, polyamide resin, polystyrene resin, silicone containing crosslinked resin) in an appropriate solvent, or the polymerized material of the above hole transport material or electron transport material that is dispersed or dissolved in an appropriate solvent, and coating and drying it.

(Colored Layer)

The colored layer (light shielding layer) 9 is provided for the purpose of optically separating the address light and the incident light at the write time to prevent malfunction due to mutual interference, and optically separating external light incident from the non-display face side of the display medium 1 and the display image at the display time to prevent deterioration of an image quality. It is noted that the colored layer 9 is not the essential component in this exemplary embodiment. To improve the performance of the display medium 1, the colored layer 9 may be provided. For this purpose, the colored layer 9 is required to have a function of absorbing at least the light in an absorption wavelength region of the charge generation layers 13 and 15, and the light in a reflection wavelength region of the liquid crystal layer 7.

The colored layer 9 can be specifically formed by a dry method for directly forming the film of an inorganic pigment (e.g., cadmium, chromium, cobalt, manganese, carbon), or an organic dye or organic pigment (azo, anthraquinone, indigo, triphenylmethane, nitro, phthalocyanine, perylene, pyrrolopyrrole, quinacridone, polycyclic quinone, squarium, azulenium, cyanine, pyrylium, anthrone) on the surface of the OPC layer 10 on the side of the charge generation layer 13, or a wet coating method for forming the film by preparing a coating liquid by dispersing or dissolving them together with polymer binder (e.g., polyvinyl alcohol resin, polyacrylic resin) in an appropriate solvent, and coating and drying it.

(Laminate Layer)

The laminate layer (adhesive layer) 8 is provided for the purpose of absorption of irregularities and adhesion in bonding the functional layers formed on the inner surfaces of the upper and lower substrates. It is noted that the laminate layer 8 is not the essential component in this exemplary embodiment. The laminate layer 8 is made of a polymer material with low glass transition point. As the material of the laminate layer 8, selected is a material that can bring the liquid crystal layer 7 and the colored layer 9 to be in close contact or to be contacted by heat or pressure. Also, the laminate layer 8 satisfies the condition that it is transparent to at least the incident light.

Examples of the suitable material for the laminate layer 8 may include sticky polymer materials (e.g., urethane resin, epoxy resin, acrylic resin, silicone resin).

Figure 12:
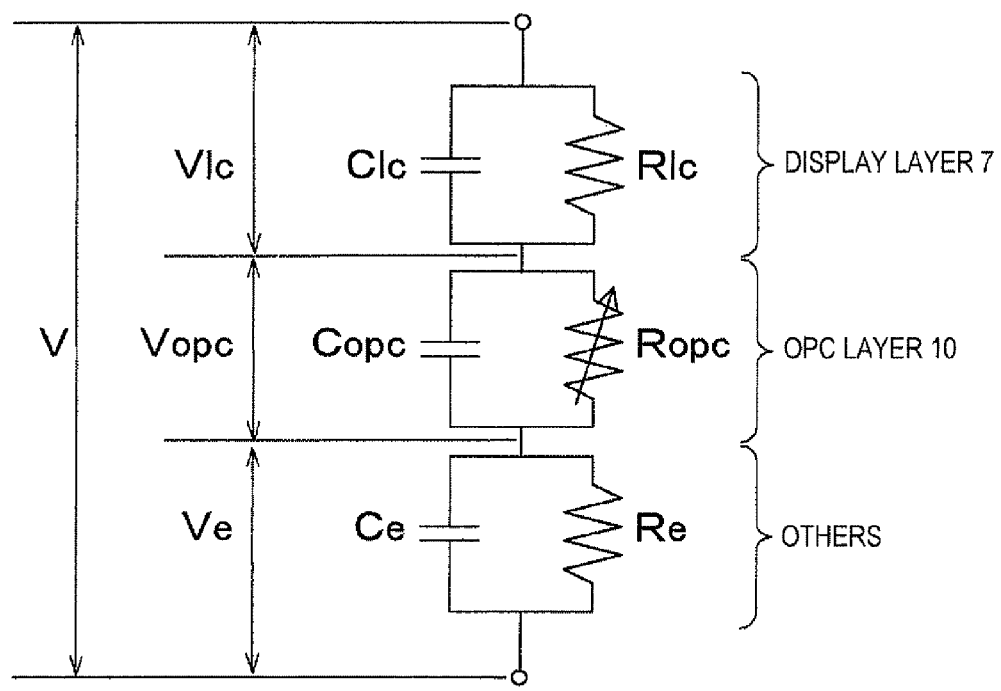
FIG. 12 is a circuit diagram showing an equivalent circuit of the liquid crystal device having the structure shown in FIG. 11.

FIG. 12 is a circuit diagram showing an equivalent circuit of the display medium (liquid crystal device) 1 having the structure as shown in FIG. 11. Clc, Copc, Rlc, and Rope denote the electrostatic capacitance of the liquid crystal layer 7, the electrostatic capacitance of the OPC layer 10, the resistance value of the liquid crystal layer 7 and the resistance value of the OPC layer 10, respectively. Ce and Re denote the equivalent electrostatic capacitance and the equivalent resistance value of the components other than the liquid crystal layer 7 and the OPC layer 10.

It is assumed that a voltage applied from the external write apparatus 2 between the transparent electrode 5 and the transparent electrode 6 is V. In this case, divided voltages Vlc, Vopc and Ve, which are determined by an impedance ratio, are applied to the respective components. Specifically, immediately after the voltage is applied, divided voltages determined by a capacity ratio among the respective components occur, and relax to the divided voltages determined by a resistance value ratio among the respective components with passage of time.

Herein, the resistance value Rope of the OPC layer 10 changes according to an intensity of the address light. Therefore, the effective voltage applied to the liquid crystal layer 7 can be controlled by selecting exposure or non-exposure. During exposure, the resistance value Rope of the OPC layer 10 becomes small, and the effective voltage applied to the liquid crystal layer 7 is increased. Conversely, during non-exposure, the resistance value Rope of the OPC layer 10 becomes large, and the effective voltage applied to the liquid crystal layer 7 is decreased.

<Write Apparatus>

The write apparatus (driving apparatus for liquid crystal device) 2 according to this exemplary embodiment is an apparatus for writing an image onto the display medium 1. The write apparatus 2 includes a light irradiation section 18 (an example of an exposure device) for applying the address light to the display medium 1, and a voltage application section 17 (an example of a power source device) for applying the bias voltage to the display medium 1, as main components. The write apparatus 2 further includes a control circuit 16 for controlling the operations of the voltage application section 17 and the light irradiation section 18

(Light Irradiation Section)

The light irradiated portion 18 (an example of the exposure device) is not limited to specific one so long as it has a function of scanning and applying a predetermined imagewise address light pattern onto the display medium 1 and can apply a desired light image pattern (spectrum, intensity and spatial frequency) onto the display medium 1 (particularly, the OPC layer) based on an input signal from the control circuit 16.

The address light applied by the light irradiation section 18 may be light containing energy in the absorption wavelength region of the OPC layer 10 as much as possible.

The light irradiation section 18 is specifically a linear array of light sources (e.g., cold cathode ray tube, xenon lamp, tungsten halogen lamp, light emitting diode (LED), EL, laser, etc.), or its combination with a polygon mirror, in which any two-dimensional light emitting pattern can be formed by making the scanning operation for scanning in one-dimensional or two-dimensional way, or its combination with an optical element (e.g., micro lens array, selfoc lens array, prism array, visibility angle adjustment sheet).

(Voltage Application Section)

The voltage application section 17 (an example of the power source device) has a function of applying a predetermined bias voltage to the display medium 1 and can apply a desired voltage waveform to the display medium (between the electrodes) based on an input signal from the control circuit 16. The voltage application section 17 may be a bipolar high voltage amplifier, for example.

The application of the voltage to the display medium 1 by the power application section 17 is made via contact terminals 19 between the transparent electrode 5 and the transparent electrode 6.

Herein, the contact terminals 19 are members which come into contact with the voltage application section 17 and the display medium 1 (transparent electrodes 5 and 6) to make conduction between the voltage application section 17 and the display medium 1. As a material of the contact terminals 19, selected is one having a high conductivity and small contact resistances with respect to the transparent electrodes 5 and 6 and the voltage application section 17. The contact terminals 19 may have a structure that it can be separated from either the transparent electrodes 5 and 6 or the voltage application section 17, or both of them to disconnect the display medium 1 and the write apparatus 2.

The contact terminals 19 are made of a metal (e.g., gold, copper, aluminum, and iron), carbon, a complex in which they are dispersed in polymer, or a conductive polymer (e.g., polythiophene, polyaniline) and have a clip connector shape for holding the electrode.

(Control Circuit)

The control circuit 16 is a member having a function of appropriately controlling the operations of the voltage application section 17 and the light irradiation section 18 in accordance with image data from an outside (an image acquiring device, an image receiving device, an image processing device, an image reproduction device or a multi-function device). Specific control processes of the control circuit 16 include three steps (actions), that is, the "initialization step (action)", "write step (action)" and "display determination step (action)".

(Overall Configuration)

Figure 13:
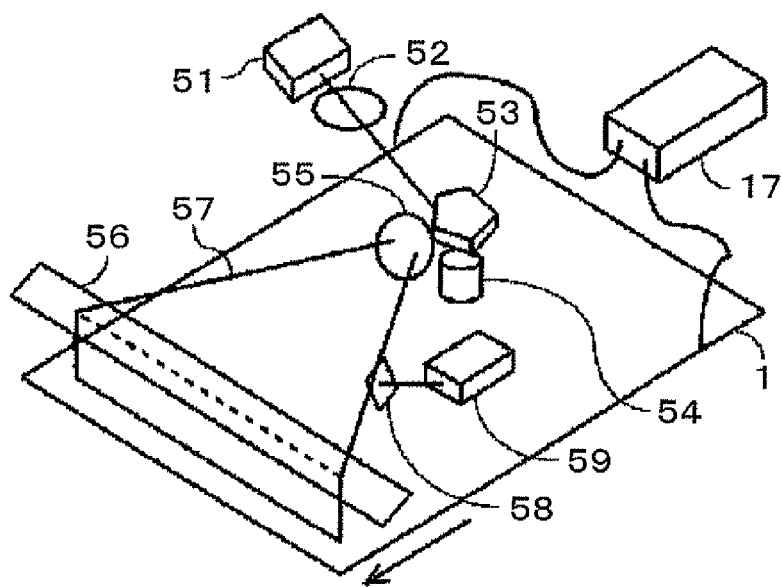
FIG. 13 is a perspective view showing an example of the driving apparatus for the liquid crystal device, which can be used to carry out the driving method for the liquid crystal device according to the exemplary embodiment.

FIG. 13 is a perspective view showing an example of a write apparatus (driving apparatus for the liquid crystal device) 2, which can be used to carry out the driving method for the liquid crystal device according to this exemplary embodiment. In FIG. 13, the exposure device uses a laser, and the control circuit 16 is not illustrated.

An exposure optical system uses a semiconductor laser as a light source 51, and includes a collimator lens 52, a polygon mirror 53, a polygon motor 54, an f-θ lens 55, and a reflecting mirror 56. In the exposure optical system, a laser beam 57 is transmitted via a beam adjusting mirror 58 to a synchronization signal generator 59, and used to synchronize a scan timing. A control device for this exposure device, which is omitted in the figure, is one similar to that for a typical electro-photographic laser exposure device.

A pulse motor may feeds the display medium 1 (an example of the liquid crystal device) in a sub-scanning direction while the display medium 1 is being fixed to have a plane shape as shown in FIG. 13. Alternatively, when the substrates of the display medium 1 are formed of films to give flexibility thereto, the display medium 1 may be fed by rotating a cylindrical drum by a motor while the display medium 1 is being fixed to the cylindrical drum.

When different voltages are supplied in the initialization operation and the write operation, the voltage application section 17 is required to have a power source capable of supplying at least two levels of voltage. However, it is not necessary for the voltage application section 17 to have such power source if both the voltages are equal.

Figure 14:
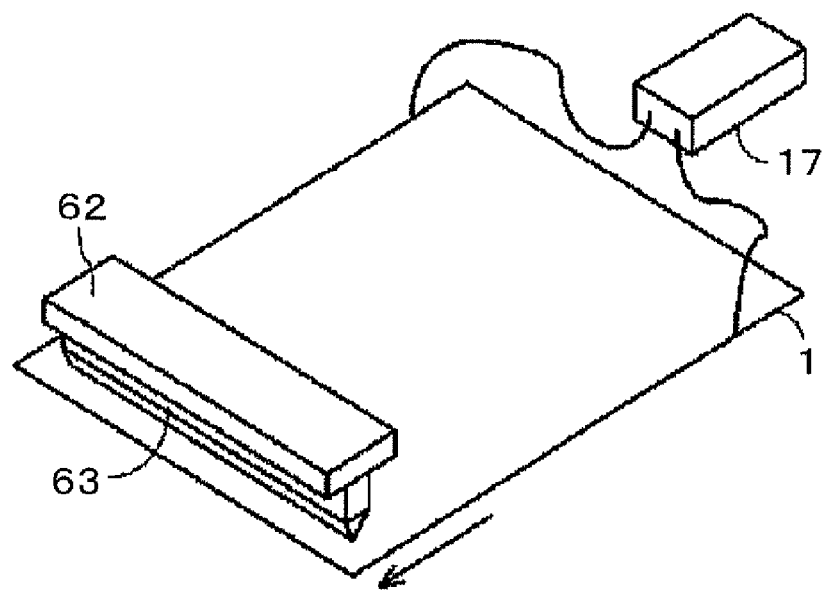
FIG. 14 is a perspective view showing another example of the driving apparatus for the liquid crystal device, which can be used to carry out the driving method for the liquid crystal device according to the exemplary embodiment.

FIG. 14 is a perspective view showing another example of the write apparatus 2 (an example of the driving apparatus for the liquid crystal device), which can be used to carry out the driving method according to this exemplary embodiment. In FIG. 14, the exposure device uses a light emitting diode array. This write apparatus 2 has the same configuration as the above example described with reference to FIG. 13, except that the light source for exposure includes a light emitting diode array 62 and a self-imaging type rod lens array 63.

<Operation>

The driving method for the liquid crystal device and the action (operation) of the driving apparatus for the liquid crystal device according to this exemplary embodiment will be described below in detail, with reference to the driving apparatus for the liquid crystal device illustrated in FIG. 11. In the following description, the "(1) gradually increasing the bias voltage", which has already been described above, will be used as the method for gradually increasing an electric field energy in the write action.

Figure 15:
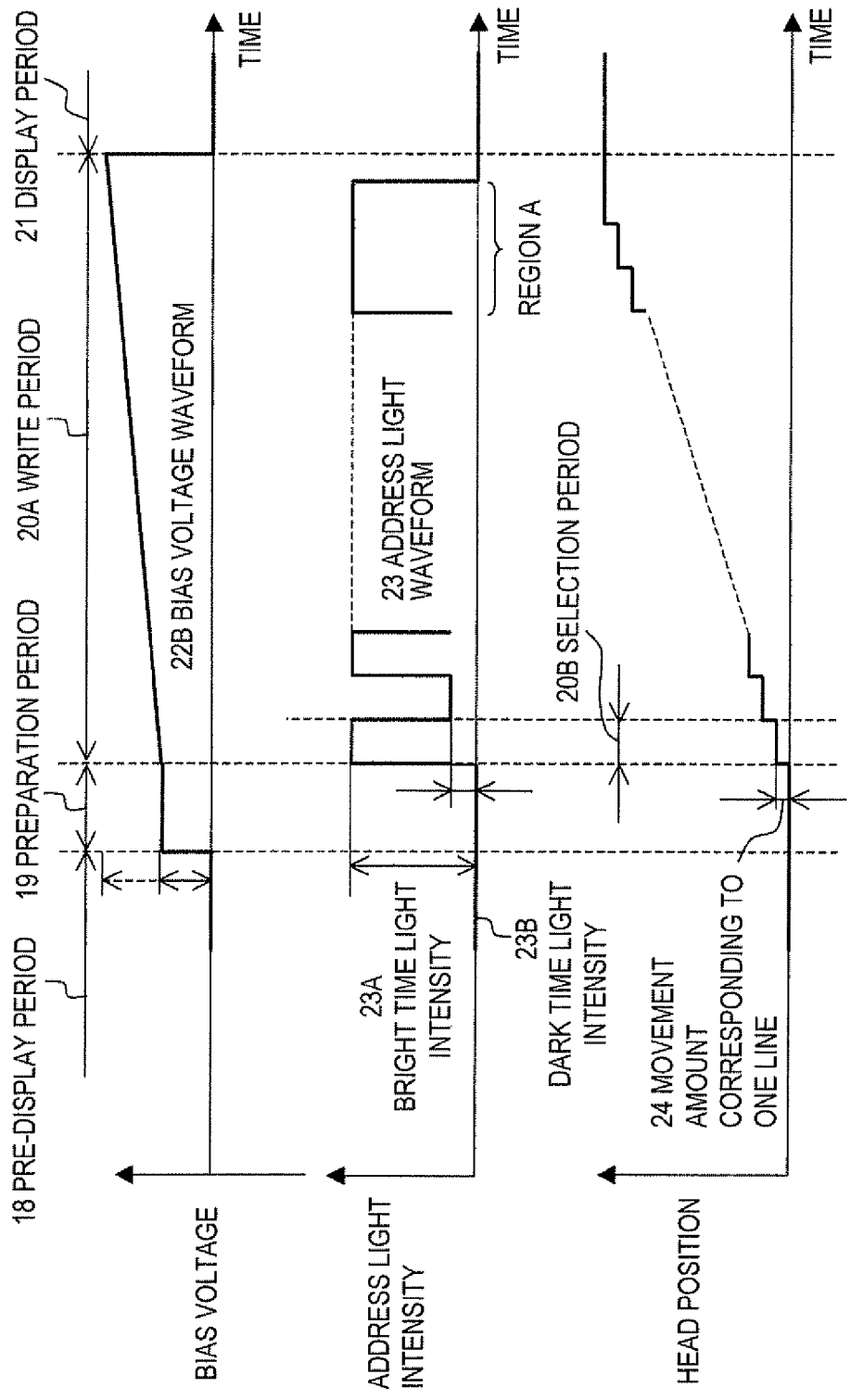
FIG. 15 is a chart showing a correlation in time series between a bias voltage, an address light intensity and a position of an exposure device (head) during the operation of the liquid crystal device driving apparatus shown in FIG. 11.

FIG. 15 is a chart showing a correlation in time series among a bias voltage, an address light intensity and a position of a head (the exposure device in the light irradiation section 18) during the operation of the driving apparatus for the liquid crystal device 2 (an example of the write apparatus) according to the exemplary embodiment shown in FIG. 11. Also, FIG. 16 is a chart schematically showing an orientation state of a liquid crystal in each period so as to correspond to the chart of FIG. 15.

The write apparatus 2 has the head at a standby position in a pre-display period 18 before driving. While the display medium 1 keeps its pre-display state, a control signal and image data are acquired and/or the control circuit 6 converts data. When the display medium 1 is disconnected from the write apparatus 2, the display medium 1 is set in a predetermined position and is connected to the contact terminals 19. The time required for the pre-display period 18 is enough long to perform a pre-process necessary for writing, such as acquiring the control signal and the image data, converting data in the control circuit 16 and setting the display medium 1.

As shown in FIG. 15, the pre-display period 18, namely, the state where the head is in the standby position and neither a bias voltage nor an address light is applied, is firstly changed to a preparation period 19 in which a bias voltage 22A formed of a DC pulse having a bias voltage waveform 22B is applied (initialization step/action).

Figure 16:
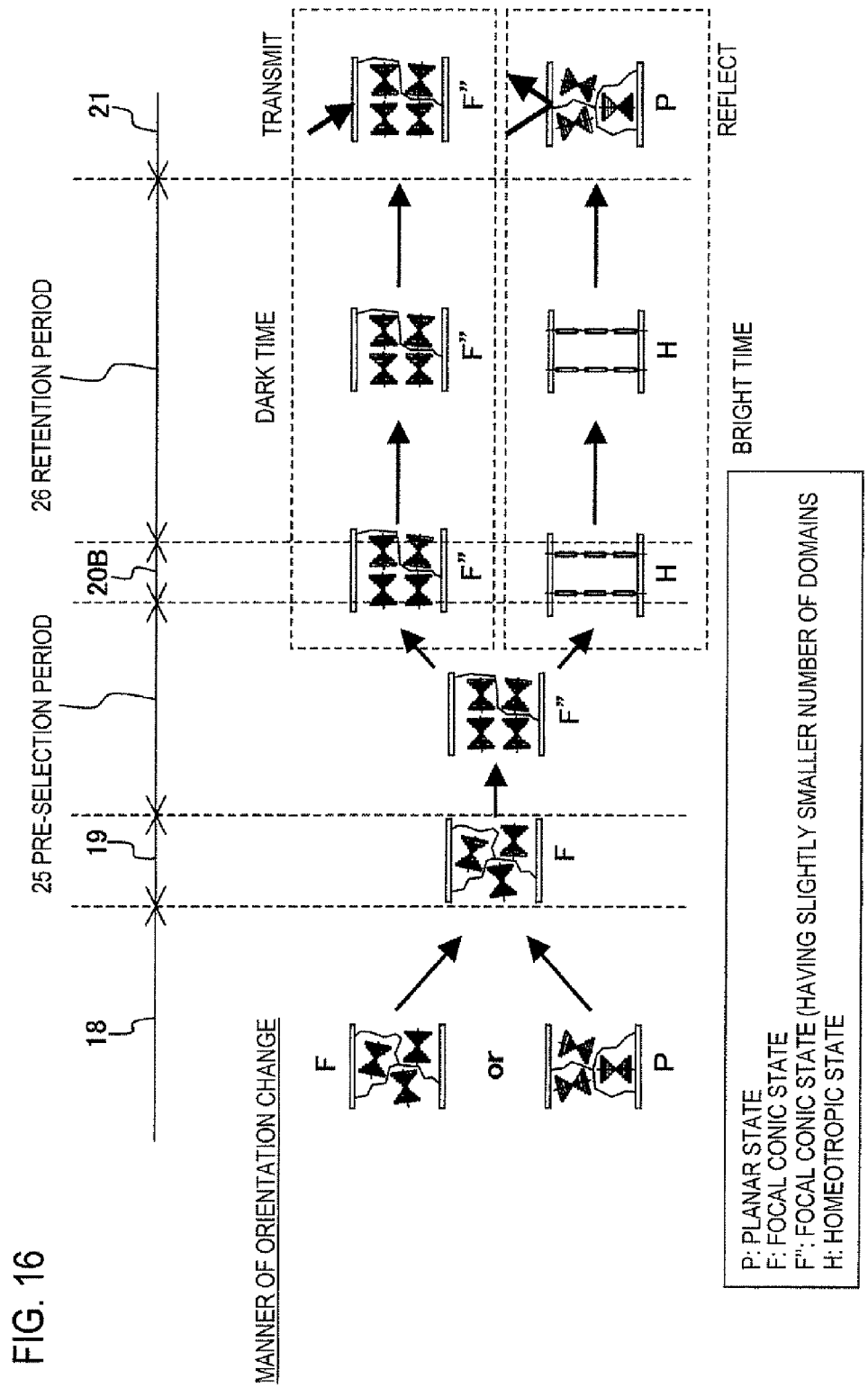
FIG. 16 is a chart schematically showing an orientation state of a liquid crystal, correspondingly to the chart of FIG. 15.
Figure 17A:
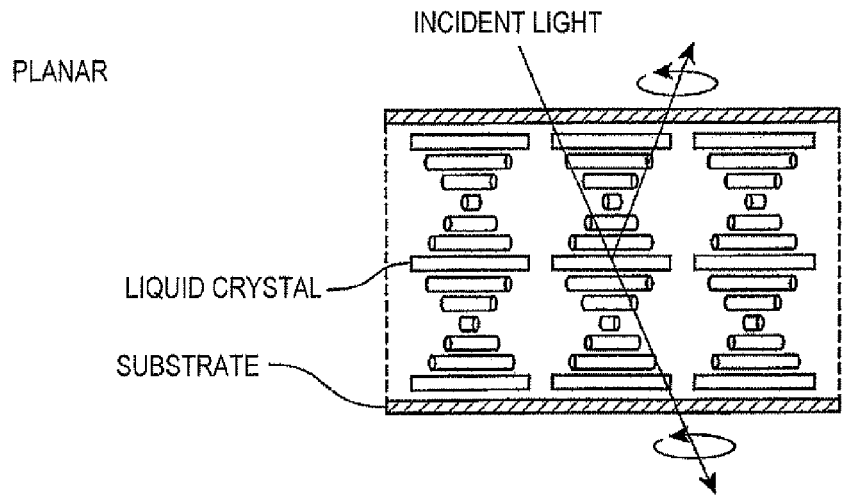
Figure 17B:
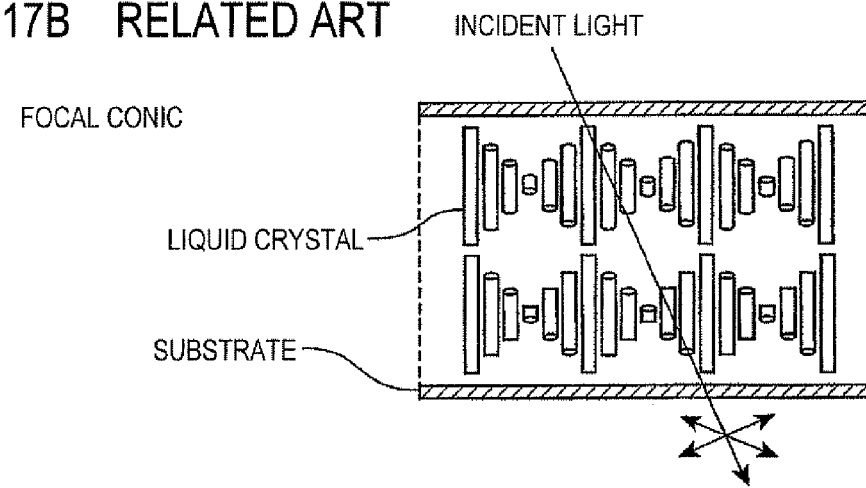
Figure 17C:
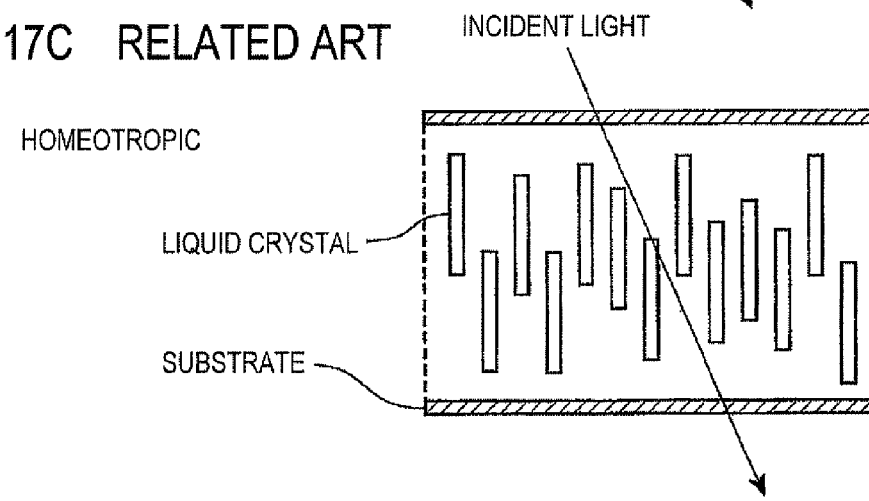
Figure 18:
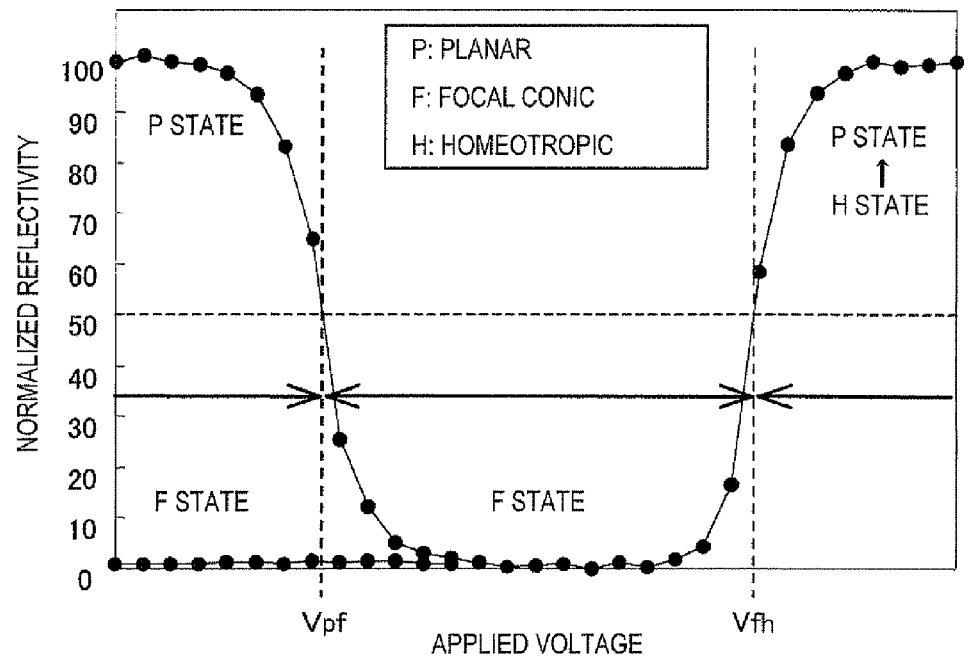
FIG. 18 is a graph for explaining the switching behavior of the cholesteric liquid crystal.

In the preparation period 19, the bias voltage 22A is applied to bring all the cholesteric liquid crystal 12 within the liquid crystal layer 7 into the focal conic state as shown in FIG. 16. The display medium 1 in which the cholesteric liquid crystal 12 is brought into the focal conic state by the operation of this step is in a state of transmitting the incident light as shown in FIG. 17.

An example of the related art adopts, as a bias voltage to be applied in the preparation period 19A, a voltage Vc being in a range of a voltage Va and overlapping a voltage Vb, which is a voltage to be applied in a write period 20A of the next step. Accordingly, the bias voltage having the same intensity is applied continuously from the preparation period 19 to the end of the write period 20A (retention period 26). Therefore, there is a difference in time for which this bias voltage is applied up to the write period, between the initial line and the final line in a series of scanning operations. Therefore, there may occur unevenness in a display image due to a variation of the sensitivity of the liquid crystal device, as previously described. However, according to this exemplary embodiment, such a concern is cleared off. Details will be described below in the write period 20A of the next process.

In the write period 20A, an actual writing is performed (write step/action). That is, the head starts scanning to select a head position corresponding to the image to be written, and light having a bright time light intensity 23A is applied for a selection period 20B. In the write period 20A, each cholesteric liquid crystal is selectively brought into the F state or the H state in response to the write image. At this stage, a reflection image is not yet formed on the display medium 1.

In this selection period 20B employing a state change from the F state to the H state at a high state change speed. Therefore, the time of the state change is greatly shortened in comparison with the state change of the related art from the P state to the F state.

As can be seen in FIGS. 11 and 12, the liquid crystal layer 7 and the OPC layer 10 are in a state where the bias voltage V is applied to both ends of the entirety of the liquid crystal layer 7 and the OPC layer 10, which are electrically connected in series. Therefore, the divided voltages of the bias voltage V are respectively applied to the liquid crystal layer 7 and the OPC layer 10. The divided voltage Vlc (i.e., a voltage applied to the liquid crystal layer 7) in the liquid crystal layer 7 is affected by a change in the resistance value Ropc of the OPC layer.

Due to the light irradiation in the selection period 20B, the resistance value Ropc of the OPC layer 10 decreases, which results in the increased divided voltage in the liquid crystal layer 7, which is electrically connected to the OPC layer 10 in series. Consequently, the liquid crystal is changed from the F state to the H state as shown in FIG. 16.

In this example, the bias voltage (write voltage) 22A has a waveform 22B gradually increasing from the start of the write period 20A to the end of the write period 20A as shown in FIG. 15. Since the bias voltage 22A gradually increases in this way, the electric field energy applied to the display medium 1 is gradually increased.

The head continues to scan successively, thereby forming a latent image in which the F state and the H state are mixed in an image shape by selecting ON/OFF of light irradiation in each area. The light irradiated area changes its state from the F state to the H state, while the light non-irradiated area is kept in the F state. The F state and H state are kept as they are while the both states are mixed.

Areas which have not yet selected by the heads are in a pre-selection period 25 until the selection period 20B comes. However, if this pre-selection period 25 is long, it is expected that the head transits to the pretty F state (F') having a few domains as shown in FIG. 10A as already described. FIG. 16 exemplary shows a line which is scanned in the middle stage of the write period 20A shown in FIG. 15, and a state of the liquid crystal in the areas, which have not yet been selected by the head, transits to the F state having slightly smaller number of domains (F" in FIG. 16).

Since the bias voltage 22A has the gradually increasing waveform 22B as previously described, the bright time voltage applied to the liquid crystal layer in the selection period 20B of FIG. 16 is larger than that for the first scan line. Therefore, it is possible to appropriately change a state of the liquid crystal layer in the F state (F") having a slightly smaller number of domains into the H state.

If it is desired to expose plural areas such as a region A of FIG. 15, for example, the address light may be continuously irradiated over plural corresponding selection periods. At this time, the head is stopped for every line to irradiate light in FIG. 15. However, each line may be scanned continuously by making adjust so that the light is irradiated for a predetermined time to each line.

Conversely, if the exposure is not made over plural areas, of course, the display medium 1 may be brought into the non-exposure state for plural consecutive selection periods. However, since it is not necessary that the head stops at a pertinent position for those periods, the head may be moved at once to the next exposure area by skipping the pertinent areas. With this configuration, the write time can be further shortened.

If the head ends scanning all the display positions (ends the series of scanning operations), not only the irradiation of the address light is stopped but also the application of the bias voltage is removed (display determination step/action). The period transits to a display period 21. In the display period 21, the applied bias voltage disappears, and the orientation of each cholesteric liquid crystal 12 is changed to a memory state with no electric field, so that the image is displayed on the display medium 1. In bright portions (areas to which the address light is applied) of the image, a state change occurs from the H state via a transient state such as transient planer (TP) to the P state, whereas in dark portions (areas to which the address light is not applied), the F state having the memory property is kept as it is. Then, the stable recorded image is finally formed on the display medium 1.

The display period 21 is not limited to a specific period so long as it is longer than or equal to a time required for each orientation change. Since the bias signal and the address light are not required, the display medium 1 may be disconnected from the write apparatus 2 during the display period 21.

The driving apparatus for the liquid crystal device and the driving method for the liquid crystal device according to the exemplary embodiment have been described in detail. However, it should be noted that the invention is not limited to the above exemplary embodiment. For example, although the mode of "(1) gradually increasing the bias voltage" is used in the exemplary embodiment as an example of the method for gradually increasing the electric field energy in the write step, the "(2) gradually increasing the light intensity" or "(3) decreasing the scanning speed" may be employed as previously described. In those cases, the bias voltage is kept constant, and the light intensity from the exposure device is controlled to gradually increase, or the scanning speed is controlled to gradually decrease. Of course, two or more of these three methods such as changing the bias voltage together may be adopted, and such a combination may be controlled to function as the method for gradually increasing the electric field energy in the write step (action), as a whole.

The liquid crystal device for forming a monochrome image in which the liquid crystal layer is formed of a single layer has been described in the above exemplary embodiment. However, the liquid crystal device may be configured to include plural liquid crystal layers and/or plural other layers in response to necessity so that a multi-color image can be formed. In this case, the liquid crystal device may be configured to form a full color image by laminating the liquid crystal layers capable of displaying three primary colors of blue, green and red.

It will be understood to a person skilled in the art that the driving apparatus for the liquid crystal device and the driving method for the liquid crystal device according to the invention may be appropriately modified in view of conventional knowledge. Such modifications may be of course encompassed within the scope of the invention, as far as they include the liquid crystal display medium of the invention, the driving apparatus for the liquid crystal device according to the invention, and the driving method for the liquid crystal device according to the invention.

EXAMPLES

The exemplary embodiment will be specifically described below with reference to examples, which do not limit the invention in any way.

The display medium 1 as shown in FIG. 11 is experimentally manufactured as the liquid crystal device to which the exemplary embodiment can be applied, and an image is written using the driving method for the liquid crystal device and the driving apparatus for the liquid crystal device according to the exemplary embodiment and using those of comparative examples. Referring to FIG. 11, the examples will be described below.

A polyethylene terephthalate (PET) film (made by Toray, high beam) having a thickness of 125 μm with an ITO (surface resistance 300Ω/□) on one surface is cut out 50.8 mm (2 inches) square to prepare the transparent substrate 4 and the transparent electrode 6. Onto the surface thereof on the ITO (transparent electrode 6) side, a paint prepared by dispersing a charge generation material (titanium phthalocyanine pigment) in a butanol solution in which polyvinyl butyral resin is dissolved by a paint shaker is coated by a spin coating method and dried to have a dry film having a thickness of 0.2 μm, to thereby form the charge generation layer 15.

Then, a paint in which polycarbonate resin and the charge transport material (benzidine N,N'-bis(3-methylphenyl)-1,1'-biphenyl-4,4'-diamine are dissolved in monochlorobenzene is coated thereon by a dip coating method and dried to have a dry film having a thickness of 6 μm, to thereby form the charge transport layer 14. Further, a paint obtained by dispersing the charge generation material (titanyl phthalocyanine pigment) in a butanol solution in which polyvinyl butyral resin is dissolved by a paint shaker is coated thereon by the spin coating method and dried, to thereby have a dry film having a thickness of 0.2 μm to form the charge generation layer 13. As a result, the OPC layer 10 having three layers of the charge generation layer 15, the charge transport layer 14 and the charge generation layer 13 is formed.

A polyvinyl alcohol aqueous solution in which carbon black pigment is dispersed is formed on the OPC layer 10 by the spin coating method to have a dry film having a thickness of 1.2 μm, to thereby form the colored layer 9. Further, as an upper layer of the colored layer 9, a two-liquid urethane laminate agent (made by Mitsui Takeda Chemical, A315/A50) diluted with butyl acetate is coated by the spin coating method to have a dry film having a thickness of 1.0 μm, to thereby form the laminate layer 8.

As the cholesteric liquid crystal, 77.5 mass % of nematic liquid crystal (made by Merk, E7), 18.8 mass % of dextrorotary chiral agent (made by Merk, CD15) and 3.7 mass % of dextrorotary chiral agent (made by Merk, R1011) are mixed to prepare the green color reflecting material.

Using a film emulsifying apparatus (made by SPG Techno, micro kit) to which a ceramic porous film having 4.2 μm in diameter is set, the cholesteric liquid crystal is emulsified in an aqueous solution of 0.25 mass % of sodium dodecylbenzenesulfonate under the condition of nitrogen pressure 11.8 kPa (0.12 kgf/cm$^2$). The obtained emulsion is in a nearly monodispersed state in which the average grain diameter of cholesteric liquid crystal drops is 149 μm and the standard deviation of grain diameter is 1.32 μm.

Then, the emulsion is left stationary to sediment the cholesteric liquid crystal drops. Then, the enriched emulsion is obtained by removing the supernatant. By adding 4 mass parts of an aqueous solution of 7.7 mass % of acid process bone gelatin (made by Nippi, gelatin strength 314) to one mass part of this enriched emulsion, a coating liquid for the liquid crystal layer having a nonvolatile content volume ratio of about 0.15 in the coating liquid for the liquid crystal layer and having a cholesteric liquid crystal volume ratio of about 0.70 in the nonvolatile content is obtained.

The PET films having the ITO transparent electrode (made by Toray, high beam), which are the same one as those used for the transparent substrate 4 and the transparent substrate 6, are used as the transparent substrate 3 and the transparent substrate 5. The coating liquid for the liquid crystal layer that is heated to 50° C. to transform gelatin in sole state is coated on the ITO surface using an applicator with a micrometer so that the gap is adjusted to have a wet film having a thickness of 90 μm after the coating.

After the substrate is held for fifteen minutes under a high temperature and at high humidity chamber of 50° C./RH 90%, the coating liquid is dried under room temperatures for twelve hours to form a PDLC layer having a thickness of about 12 μm in which monodispersed cholesteric liquid crystal drops having 15 μm in diameter are dispersed in slightly flat shape in monolayer and densely in the polymer binder as the liquid crystal layer 7.

Two substrates fabricated in this way are superimposed so that the liquid crystal layer 7 and the laminate layer 8 face each other with a part of the end faces of them slightly being shifted. Then, the two substrates are bonded through a laminator at 100° C. to obtain the display medium 1 (an example of the liquid crystal device).

Each functional film on the shifted end face is removed to expose the ITO electrode. Thereby, both the transparent electrodes 5 and 6 can be conductively connected from an outside of the display medium 1 finally obtained.

A bagworm clip (contact terminal 19) sold on the market with the lead wire is connected to both the transparent electrodes 5 and 6 of the obtained display medium 1, and the other end of the lead wire is connected to a fast, high voltage amplifier (made by Matsusada precision, HEOPT-1B60 type) serving as the voltage application section 17. A DC bias voltage from 0 to 1000V is applied from the fast, high voltage amplifier.

On the other hand, a light emitting diode light source (made by CCS, HLV-27-NR-R type) is used as the light source, and mounted on a linear stage (made by Oriental Motor, EZlimo EZHS type) to scan the surface of the display medium 1 on the OPC layer 10 side, to constitute the light irradiation section 18. The light irradiation section 18 can irradiate a red light having a peak wavelength of 625 nm, a half band width of 20 nm and an irradiation intensity of 1.0 mW/cm$^2$.

Also, an arbitrary waveform generator (made by NF Circuit Design Block, EZ1960 type) is used as the control circuit 16, and is wired to appropriately control the operations of the voltage application section 17 and the light irradiation section 18 based on image data from the personal computer.

In the above way, the write apparatus (driving apparatus for the liquid crystal device) 2 is obtained to which the display medium (liquid crystal device) 1 of this exemplary embodiment and the comparative example.

COMPARATIVE EXAMPLE 1

After the initialization step (process) for bringing the entire surface of the display medium into the F state is performed by applying a bias voltage of 150 V for 200 ms from the voltage application section 17, the write step (process) is performed by exposing the display medium 1 to the red light having a constant irradiation intensity (1.0 mW/cm$^2$) from the light irradiation section 18 at a fixed (250 mm/s) scanning speed while applying a constant (150 V) bias voltage. The time elapsed from the start of this scanning operation to the start of the write step for the final line is about 200 ms.

After the end of the write action, the applied bias voltage is stopped (display determination action (step)) After a few seconds, a reflectivity of a portion in the first line and a reflectivity of a portion in the final line on the display face (surface on the side of the liquid crystal layer 7) of the display medium 1 are measured, using an integrating sphere spectrometer (made by Konica Minolta, CM2002 type). The results are shown in table 1 below.

Herein, the reflectivity is obtained by normalizing a reflection strength, which is measured under the SCE (positive reflected light removal) condition in accordance with a diffusion illumination perpendicular light receiving method of JIS Z 8772, with assuming that the perfect diffusion plane is 100%.

EXAMPLE 1

In the example 1, which is the same as the comparative example 1 except that an input signal from the control circuit 16 to the voltage application section 17 is changed so that the bias voltage of the write action (step) is gradually increased at a change rate of 12 V per second, an image is written in the same way as in the comparative example 1. Then, a reflectivity of a portion in the first line and a reflectivity of a portion in the final line on the display face of the display medium 1 are measured, using the integrating sphere spectrometer (made by Konica Minolta, CM2002 type). The results are shown in table 1 below.

EXAMPLE 2

In the example 2, which is the same as the comparative example 1 except that an input signal from the control circuit 16 to the light irradiation section 18 is changed so that the light irradiation intensity of the write action (step) is gradually increased at a change rate of 0.1 mW/cm$^2$, an image is written in the same way as in the comparative example 1. Then, a reflectivity of a portion in the first line and a reflectivity of a portion in the final line on the display face of the display medium 1 are measured, using the integrating sphere spectrometer (made by Konica Minolta, CM2002 type). The results are shown in table 1 below.

EXAMPLE 3

In the example 3, which is the same as the comparative example 1 except that an input signal from the control circuit 16 to the light irradiation section 18 is changed so that the scanning speed of the write action (step) is gradually decreased at a change rate of 20 mm/s, an image is written in the same way as in the comparative example 1. Then, a reflectivity of a portion in the first line and a reflectivity of a portion in the final line on the display face of the display medium 1 are measured, using the integrating sphere spectrometer (made by Konica Minolta, CM2002 type). The results are shown in table 1 below.

TABLE 1

|  | Reflectivity of First Line (%) | Reflectivity of Final Line (%) |
|---|---|---|
| Comparative example 1 | 13.72 | 10.81 |
| Example 1 | 13.76 | 13.71 |
| Example 2 | 13.69 | 13.77 |
| Example 3 | 13.69 | 13.64 |

As will be apparent from the results of table 1, in the examples 1 to 3, which adopt the method for gradually increasing the electric field energy in the write step (action), the reflectivity of the portion in first line and the reflectivity of the portion in final line are approximate to each other. Also, in the examples 1 to 3, it can be seen that a variation in reflectivity is suppressed, and a display image having less unevenness can be obtained.

What is claimed is:

1. A driving apparatus for a liquid crystal device, the driving apparatus for recording an image onto the liquid crystal device, the liquid crystal device including at least
   a liquid crystal layer containing a cholesteric liquid crystal,
   a photoconductor layer, wherein the liquid crystal layer and the photoconductor layer are laminated, and
   electrodes disposed outside the liquid crystal layer and the photoconductor layer,
   the driving apparatus at least comprising:
   a power source device configured to apply a voltage between the electrodes;
   an exposure device configured to expose the liquid crystal device while scanning the liquid crystal device; and
   a controller configured to control the power source device and the exposure device by performing, in order,
     (i) an initialization action of initializing the entire liquid crystal layer into a focal conic state by causing the power source device to apply a voltage that exceeds a threshold value for a state change of the liquid crystal layer from a planer state to the focal conic state,
     (ii) a write action of writing the image onto the liquid crystal device by causing the exposure device to scan with selecting exposure or non-exposure while causing the power source device to apply a voltage, the voltage that does not exceed a threshold value for a state change of the liquid crystal layer from the focal conic state to a homeotropic state during the non-exposure but exceeds the threshold value during the exposure, the voltage that causes the focal conic state and the homeotropic state to be bi-stable after the exposure, and
     (iii) a display determination action of stopping the power source device to apply the voltage, to change a state of a portion, of which the state has changed to the homeotropic state, to the planer state, wherein
   in the write action, the controller controls at least the power source device and the exposure device so that an electric field energy applied to an exposure portion of the liquid crystal layer gradually increases from a start of a series of scanning actions to an end of the series of scanning actions.

2. The driving apparatus according to claim 1, wherein in the write action, a magnitude of the applied voltage is controlled to gradually increase from the start of the series of scanning actions to the end of the series of scanning actions.

3. The driving apparatus according to claim 1, wherein in the write action, a light intensity of the exposure portion is controlled to gradually increase from the start of the series of scanning actions to the end of the series of scanning actions.

4. The driving apparatus according to claim 1, wherein in the write action, a scanning speed is controlled to be gradually slower from the start of the series of scanning actions to the end of the series of scanning actions.

5. The driving apparatus according to claim 1, wherein the exposure device is a laser beam exposure device.

6. The driving apparatus according to claim 1, wherein the exposure device includes a light emitting diode array.

7. A method for driving a liquid crystal device to record an image onto the liquid crystal device, the liquid crystal device including at least a liquid crystal layer containing a cholesteric liquid crystal,
a photoconductor layer, wherein the liquid crystal layer and the photoconductor layer are laminated, and
electrodes disposed outside the liquid crystal layer and the photoconductor layer, the method comprising:
- an initialization step of initializing the entire liquid crystal layer into a focal conic state by applying, between the electrodes, a voltage that exceeds a threshold value for a state change of the liquid crystal layer from a planer state to the focal conic state;
- a write step of writing the image onto the liquid crystal device by scanning with selecting exposure or non-exposure while applying between the electrodes a voltage that does not exceed a threshold value for a state change of the liquid crystal layer from the focal conic state to a homeotropic state during the non-exposure but exceeds the threshold value during the exposure, the voltage that causes the focal conic state and the homeotropic state to be bi-stable after the exposure; and
- a display determination step of stopping to apply the voltage, to change a state of a portion, of which the state has changed to the homeotropic state, to the planer state, wherein in the write step, an electric field energy applied to an exposure portion of the liquid crystal layer is controlled to gradually increase from a start of a series of scanning operations to an end of the series of scanning operations.

8. The method according to claim 7, wherein in the write step, a magnitude of the applied voltage is controlled to gradually increase from the start of the series of scanning operations to the end of the series of scanning operations.

9. The method according to claim 7, wherein in the write step, a light intensity of the exposure portion is controlled to gradually increase from the start of the series of scanning operations to the end of the series of scanning operations.

10. The method according to claim 7, wherein in the write step, a scanning speed is controlled to be gradually slower from the start of the series of scanning operations to the end of the series of scanning operations.

11. The method according to claim 7, wherein a laser beam is used as an exposure device.

12. The method according to claim 7, wherein a light emitting diode array is used as an exposure device.

* * * * *